US012614660B2

(12) United States Patent
Yoshioka et al.

(10) Patent No.: US 12,614,660 B2
(45) Date of Patent: Apr. 28, 2026

(54) INDUCTOR COMPONENT AND MOUNTING STRUCTURE OF INDUCTOR COMPONENT

(71) Applicant: Murata Manufacturing Co., Ltd., Kyoto-fu (JP)

(72) Inventors: Yoshimasa Yoshioka, Nagaokakyo (JP); Ryouta Sakurai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 776 days.

(21) Appl. No.: 17/898,084

(22) Filed: Aug. 29, 2022

(65) Prior Publication Data

US 2023/0060320 A1 Mar. 2, 2023

(30) Foreign Application Priority Data

Aug. 31, 2021 (JP) ................................ 2021-141622

(51) Int. Cl.

| | |
|---|---|
| ***H01F 27/30*** | (2006.01) |
| ***H01F 27/23*** | (2006.01) |
| ***H01F 27/28*** | (2006.01) |
| ***H01F 27/29*** | (2006.01) |
| ***H01F 27/32*** | (2006.01) |
| ***H01F 37/00*** | (2006.01) |

(52) U.S. Cl.

CPC ........... *H01F 27/292* (2013.01); *H01F 27/23* (2013.01); *H01F 27/2828* (2013.01); *H01F 27/32* (2013.01); *H01F 37/005* (2013.01)

(58) Field of Classification Search

CPC ..................................................... H01F 27/292

USPC ................................................ 336/192, 200

See application file for complete search history.

(56) References Cited

U.S. PATENT DOCUMENTS 3,988,764 A * 10/1976 Cline .................. H01F 17/0006 257/E29.325
7,791,837 B2 * 9/2010 Fujiwara ............. H01L 23/5227 360/123.41
8,347,490 B1 * 1/2013 Kuo ....................... H05K 1/165 336/200

(Continued)

FOREIGN PATENT DOCUMENTS

CN 111799057 A 10/2020
JP H11-251146 A 9/1999

(Continued)

*Primary Examiner* — Ronald Hinson

(74) *Attorney, Agent, or Firm* — Studebaker Brackett PLLC

(57) ABSTRACT

An inductor component includes an element body; and a coil on the element body and wound into a spiral shape along an axis. The element body includes a substrate having first and second principal surfaces facing each other. The coil includes at least one first coil wiring on the first principal surface, at least one second coil wiring on the second principal surface, at least one first through wiring penetrating the substrate from the first principal surface to the second principal surface, and at least one second through wiring penetrating the substrate from the first principal surface to the second principal surface, and on a side opposite to the first through wiring with respect to the axis. The first coil wiring, the first through wiring, the second coil wiring, and the second through wiring are connected in sequence to constitute at least a part of the spiral shape.

19 Claims, 19 Drawing Sheets

(56) References Cited

U.S. PATENT DOCUMENTS

| | | | | |
|---|---|---|---|---|
| 2006/0145805 | A1* | 7/2006 | Kim | H01F 17/0006 336/200 |
| 2007/0123387 | A1* | 5/2007 | Mansell | H05K 1/165 477/117 |
| 2008/0143468 | A1* | 6/2008 | Yokoyama | H01F 27/292 336/200 |
| 2022/0093546 | A1* | 3/2022 | Elsherbini | H01L 23/49822 |

FOREIGN PATENT DOCUMENTS

| | | | |
|---|---|---|---|
| JP | 2004-296816 | A | 10/2004 |
| JP | 2005-039187 | A | 2/2005 |
| JP | 2007-273804 | A | 10/2007 |
| JP | 2020-174169 | A | 10/2020 |
| WO | 2018/043318 | A1 | 3/2018 |

* cited by examiner

INDUCTOR COMPONENT AND MOUNTING STRUCTURE OF INDUCTOR COMPONENT

CROSS-REFERENCE TO RELATED APPLICATION

This application claims benefit of priority to Japanese Patent Application No. 2021-141622, filed Aug. 31, 2021, the entire content of which is incorporated herein by reference.

BACKGROUND

Technical Field

The present disclosure relates to an inductor component and a mounting structure of an inductor component.

Background Art

Conventionally, as an inductor component, there is an inductor component described in Japanese Patent Application Laid-Open No. H11-251146. The inductor component includes an element body and a coil provided on the element body and wound into a spiral shape along an axis.

SUMMARY

Also, the entire coil is embedded in the element body in the conventional inductor component. Therefore, it is necessary to increase a size of the element body in order to protect the coil from the external environment and secure reliability of the coil. As a result, it is difficult to reduce a component size.

Therefore, the present disclosure provides an inductor component and a mounting structure of an inductor component which can secure reliability of a coil while reducing a component size.

An inductor component according to an aspect of the present disclosure includes an element body; and a coil provided on the element body and wound into a spiral shape along an axis, in which the element body includes a substrate having a first principal surface and a second principal surface facing each other. The coil includes at least one first coil wiring provided on the first principal surface, at least one second coil wiring provided on the second principal surface, at least one first through wiring provided to penetrate the substrate from the first principal surface to the second principal surface, and at least one second through wiring provided to penetrate the substrate from the first principal surface to the second principal surface, and arranged on a side opposite to the first through wiring with respect to the axis. The first coil wiring, the first through wiring, the second coil wiring, and the second through wiring are connected in sequence to constitute at least a part of the spiral shape. The at least one second coil wiring includes a both-end connecting coil wiring having a first end portion connected to the first through wiring and a second end portion connected to the second through wiring. A portion of an outer surface of the both-end connecting coil wiring is exposed to at least an outside, and the portion is located on a side opposite to the second principal surface, and an exposed surface of the outer surface exposed to the outside contains a corrosion-resistant conductive material.

According to the aspect, at least a portion, located on the side opposite to the second principal surface, of the outer surface of the both-end connecting coil wiring is exposed to the outside, and thus, a size of the inductor component in a direction orthogonal to the second principal surface can be reduced as compared with a case where the portion is covered with an insulating layer, and the inductor component can be downsized. Since the exposed surface of the outer surface exposed to the outside contains the corrosion-resistant conductive material, a corrosion resistance of the second coil wiring can be enhanced to protect the second coil wiring from deterioration caused by an external environment although the second coil wiring has the exposed surface. As a result, the reliability of the coil can be secured.

Preferably, in an embodiment of the inductor component, an external electrode electrically connected to the coil is further provided on the element body, and the corrosion-resistant conductive material is identical to a conductive material forming an outer surface of the external electrode.

According to the above embodiment, since the corrosion-resistant conductive material is the same as the conductive material forming the outer surface of the external electrode, at least a part of the second coil wiring can be simultaneously formed at the time of manufacturing the external electrode, and the second coil wiring can be easily manufactured. In addition, stability to the external environment can be secured since the corrosion-resistant conductive material is the same as the conductive material forming the outer surface of the external electrode.

Preferably, in an embodiment of the inductor component, the external electrode is provided on the first principal surface of the substrate.

According to the above embodiment, the external electrode can be easily manufactured since the external electrode is provided on the first principal surface of the substrate.

Preferably, in an embodiment of the inductor component, the corrosion-resistant conductive material is Au, Ti, a Ti alloy, Al or an Al alloy.

According to the above embodiment, the corrosion resistance of the both-end connecting coil wiring can be improved.

Preferably, in an embodiment of the inductor component, the first coil wiring includes one or more conductive layers, the both-end connecting coil wiring includes two or more conductive layers, and the number of the conductive layers of the both-end connecting coil wiring is larger than the number of the conductive layers of the first coil wiring.

According to the above embodiment, since the number of conductive layers of the first coil wiring can be made small, the first coil wiring can be easily manufactured.

Preferably, in an embodiment of the inductor component, an insulating layer is provided on the first principal surface, and no insulating layer is provided on the second coil wiring.

According to the above embodiment, the inductor component can be downsized since no insulating layer is provided on the second coil wiring.

Preferably, in an embodiment of the inductor component, a conductive material as a main component of the first coil wiring and a conductive material as a main component of the second coil wiring are identical to a conductive material of at least one of the first through wiring and the second through wiring.

Here, the main component of the coil wiring refers to a conductive material having the largest occupied area in a section orthogonal to an extending direction of the coil wiring.

According to the above embodiment, a coefficient of linear expansion of the entire coil can be made uniform, and thus, it is possible to suppress damage of the coil caused by an expansion difference between the wirings.

Preferably, in an embodiment of the inductor component, an external electrode electrically connected to the coil is further provided on the first principal surface, and the first coil wiring is covered with an insulating layer.

According to the above embodiment, insulation between the first coil wiring and the external electrode can be secured when the external electrode is provided on the first principal surface.

Preferably, in an embodiment of the inductor component, the second coil wiring includes a main body made of a conductive material identical to a conductive material of the first coil wiring, and a covering layer covering the main body and containing the corrosion-resistant conductive material, and a line width of the main body is smaller than a line width of the first coil wiring.

Here, the line width of the first coil wiring refers to a length of the first coil wiring in a direction parallel to the first principal surface in the section orthogonal to the extending direction of the first coil wiring. The line width of the main body refers to a length of the main body in a direction parallel to the second principal surface in the section orthogonal to the extending direction of the second coil wiring.

According to the above embodiment, a risk of a short circuit of the second coil wiring can be reduced.

Preferably, in an embodiment of the inductor component, the second coil wiring includes a main body made of a conductive material identical to the conductive material of the first coil wiring, and a covering layer covering the main body and containing the corrosion-resistant conductive material, and a thickness of the main body is smaller than a thickness of the first coil wiring.

Here, the thickness of the first coil wiring refers to a length of the first coil wiring in a direction orthogonal to the first principal surface in the section orthogonal to the extending direction of the first coil wiring. The thickness of the main body refers to a length of the main body in a direction orthogonal to the second principal surface in the section orthogonal to the extending direction of the second coil wiring.

According to the above embodiment, the size of the inductor component in the direction orthogonal to the second principal surface can be further reduced, and the inductor component can be further downsized.

Preferably, in an embodiment of the inductor component, at least a part of the covering layer covers outer surfaces of the main body on both sides in a width direction, and $W1>W21>W221+W222$ is satisfied, where W1 is a line width of the second coil wiring, W21 is the line width of the main body, W221 is a width of the covering layer covering the outer surface of the main body on one side in the width direction, and W222 is a width of the covering layer covering the outer surface of the main body on another side in the width direction.

Here, the "width direction" refers to the direction parallel to the second principal surface in the section orthogonal to the extending direction of the second coil wiring. The "width of the covering layer covering the outer surface of the main body on one side in the width direction" refers to a length of the covering layer, which covers the outer surface of the main body on the one side in the width direction, in the direction parallel to the second principal surface in the section orthogonal to the extending direction of the second coil wiring. Similarly, the "width of the covering layer covering the outer surface of the main body on another side in the width direction" refers to a length of the covering layer, which covers the outer surface of the main body on the another side in the width direction, in the direction parallel to the second principal surface in the section orthogonal to the extending direction of the second coil wiring.

According to the above embodiment, the risk of the short circuit of the second coil wiring can be reduced since "$W1>W21$" is satisfied. In addition, the proportion of the main body occupying in the second coil wiring increases since "$W21>W221+W222$" is satisfied. When a material having a low resistivity is used as the conductive material of the first coil wiring, the resistivity of the main body made of the same conductive material as the first coil wiring also decreases. Therefore, the resistance of the second coil wiring can be reduced.

Preferably, in an embodiment of the inductor component, $T1>T21>2\times T22$ is satisfied, where T1 is a thickness of the second coil wiring, T is the thickness of the main body, and T is a thickness of the covering layer in a direction orthogonal to the second principal surface.

Here, the "thickness of the covering layer in the direction orthogonal to the second principal surface" refers to a thickness of a portion of the covering layer overlapping the main body when viewed from the direction orthogonal to the second principal surface.

According to the above embodiment, since "$T1>T21$" is satisfied, the size of the inductor component in the direction orthogonal to the second principal surface can be further reduced, and the inductor component can be further downsized. In addition, a short circuit between the second coil wirings can be suppressed since "$T21>2\times T22$" is satisfied.

Preferably, in an embodiment of the inductor component, a plurality of the second coil wirings are present, and an insulating layer is provided between the second coil wirings adjacent to each other.

According to the above embodiment, insulation between the adjacent second coil wirings can be secured.

Preferably, in an embodiment of the inductor component, a plurality of the first coil wirings, a plurality of the second coil wirings, a plurality of the first through wirings, and a plurality of the second through wirings are present, a pitch between the first through wirings adjacent to each other is 10 μm or more and 150 μm or less (i.e., from 10 μm to 150 μm), and a pitch between the second through wirings adjacent to each other is 10 μm or more and 150 μm or less (i.e., from 10 μm to 150 μm).

According to the embodiment, it is possible to suppress short circuits between the adjacent first coil wirings, between the adjacent second coil wirings, between the adjacent first through wirings, and between the adjacent second through wirings since the pitch between the first through wirings is 10 μm or more, and the pitch between the second through wirings is 10 μm or more. In addition, a coil length can be shortened, and inductance acquisition efficiency can be improved since the pitch between the first through wirings is 150 μm or less and the pitch between the second through wirings is 150 μm or less.

An inductor component according to an aspect of the present disclosure includes: an element body; a coil provided on the element body and wound into a spiral shape along an axis; and an external electrode provided on the element body and electrically connected to the coil, in which the element body includes a substrate having a first principal surface and a second principal surface facing each other. The coil includes at least one first coil wiring provided on the first principal surface, at least one second coil wiring provided on the second principal surface, at least one first through wiring provided to penetrate the substrate from the first principal surface to the second principal surface, and at least one second through wiring provided to penetrate the substrate from the first principal surface to the second principal surface, and arranged on a side opposite to the first through wiring with respect to the axis. The first coil wiring, the first through wiring, the second coil wiring, and the second through wiring are connected in sequence to constitute at least a part of the spiral shape. The at least one second coil wiring includes a both-end connecting coil wiring having a first end portion connected to the first through wiring and a second end portion connected to the second through wiring. A portion of an outer surface of the both-end connecting coil wiring is exposed to at least an outside, and the portion is located on a side opposite to the second principal surface, and a conductive material forming an exposed surface of the outer surface exposed to the outside is identical to a conductive material forming an outer surface of at least a part of the external electrode.

At least a portion, located on the side opposite to the second principal surface, of the outer surface of the both-end connecting coil wiring is exposed to the outside, and thus, a size of the inductor component in a direction orthogonal to the second principal surface can be reduced as compared with a case where the portion is covered with an insulating layer, and the inductor component can be downsized. In addition, the conductive material forming the exposed surface exposed to the outside of the outer surface is the same as the conductive material forming the outer surface of the external electrodes. Therefore, when the second coil wiring has the exposed surface, the resistance of the second coil wiring to the external environment can be made equal to that of the external electrode, and the second coil wiring can be protected from deterioration caused by the external environment. As a result, the reliability of the inductor component can be secured.

A mounting structure of an inductor component according to an aspect of the present disclosure includes: a mounting substrate; and the inductor component mounted on a mounting surface of the mounting substrate, in which the axis of the coil is orthogonal to the mounting surface.

According to the above aspect, since the axis of the coil is orthogonal to the mounting surface, a magnetic flux of the inductor component does not affect another inductor component adjacent to the inductor component, and the degree of freedom of a mounting layout is improved.

A mounting structure of an inductor component according to an aspect of the present disclosure includes: a mounting substrate; and the inductor component mounted on a mounting surface of the mounting substrate, in which the axis of the coil is parallel to the mounting surface.

According to the above aspect, since the axis of the coil is parallel to the mounting surface, the magnetic flux of the inductor component is not affected by a wiring portion of the mounting substrate, and a decrease in the inductance acquisition efficiency can be suppressed.

Preferably, in an embodiment of the mounting structure of an inductor component, the element body has a length, a width, and a height, and the inductor component is arranged on the mounting surface such that a direction of the shortest dimension among the length, the width, and the height of the element body is orthogonal to the mounting surface.

According to the above embodiment, the direction of the shortest dimension among the length, the width, and the height of the element body becomes a thickness direction, and a thickness of the inductor component can be reduced.

Preferably, in an embodiment of the mounting structure of an inductor component, the element body has a length, a width, and a height, and the inductor component is arranged on the mounting surface such that a direction of the longest dimension among the length, the width, and the height of the element body is orthogonal to the mounting surface.

According to the above embodiment, directions of shorter dimensions among the length, the width, and the height of the element body determine the mounting surface of the inductor component, and the mounting area of the inductor component can be reduced.

According to the inductor component, which is one aspect of the present disclosure, and the mounting structure of the inductor component, it is possible to secure the reliability of the coil while reducing the component size.

DETAILED DESCRIPTION

Figure 1:
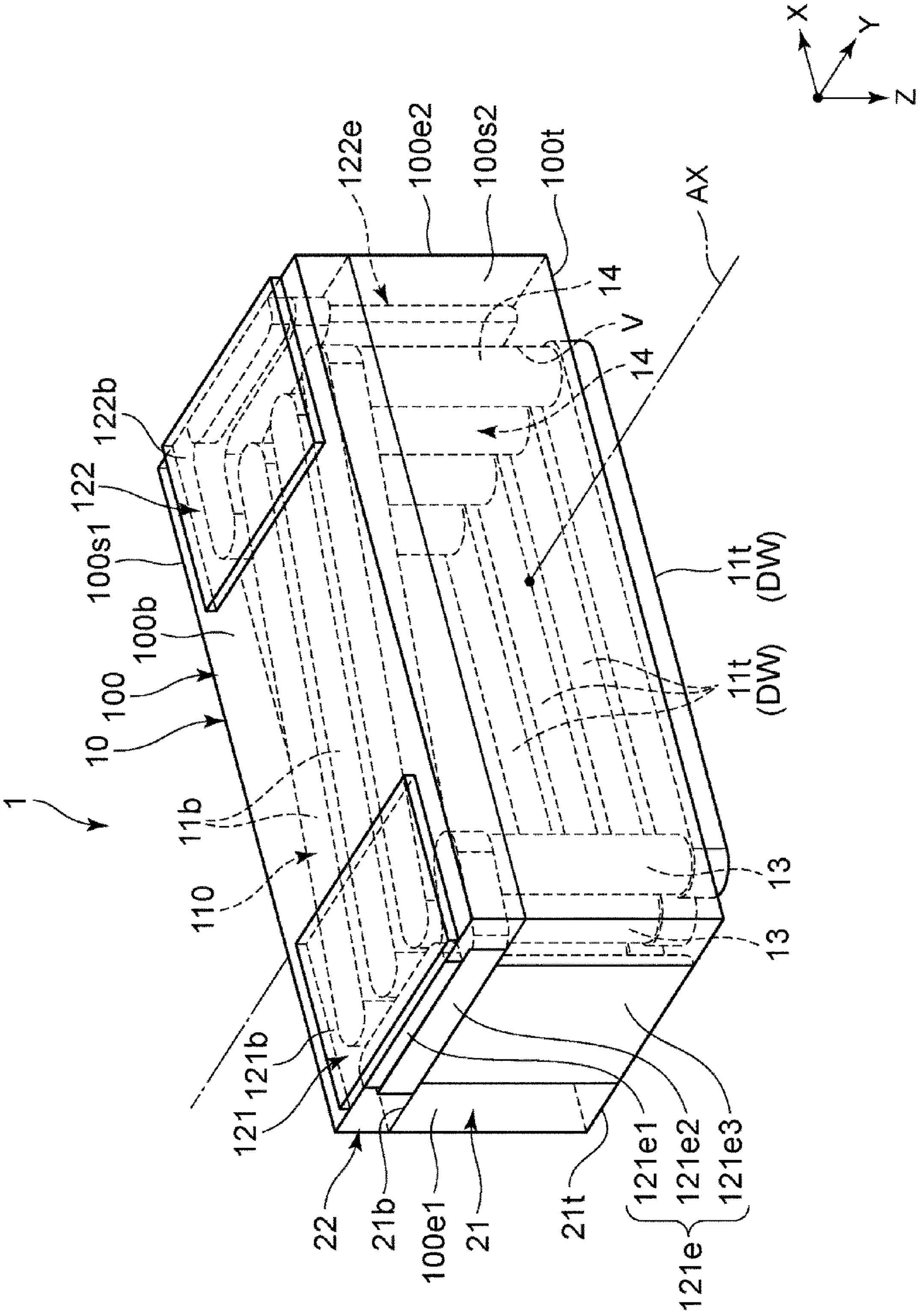
FIG. 1 is a schematic perspective view of an inductor component when viewed from a bottom surface side.

Hereinafter, an inductor component, which is one aspect of the present disclosure, and a mounting structure of the inductor component will be described in detail with reference to embodiments illustrated in the drawings. Note that the drawings include some schematic views, and do not reflect actual dimensions and ratios in some cases.

First Embodiment

Figure 2:
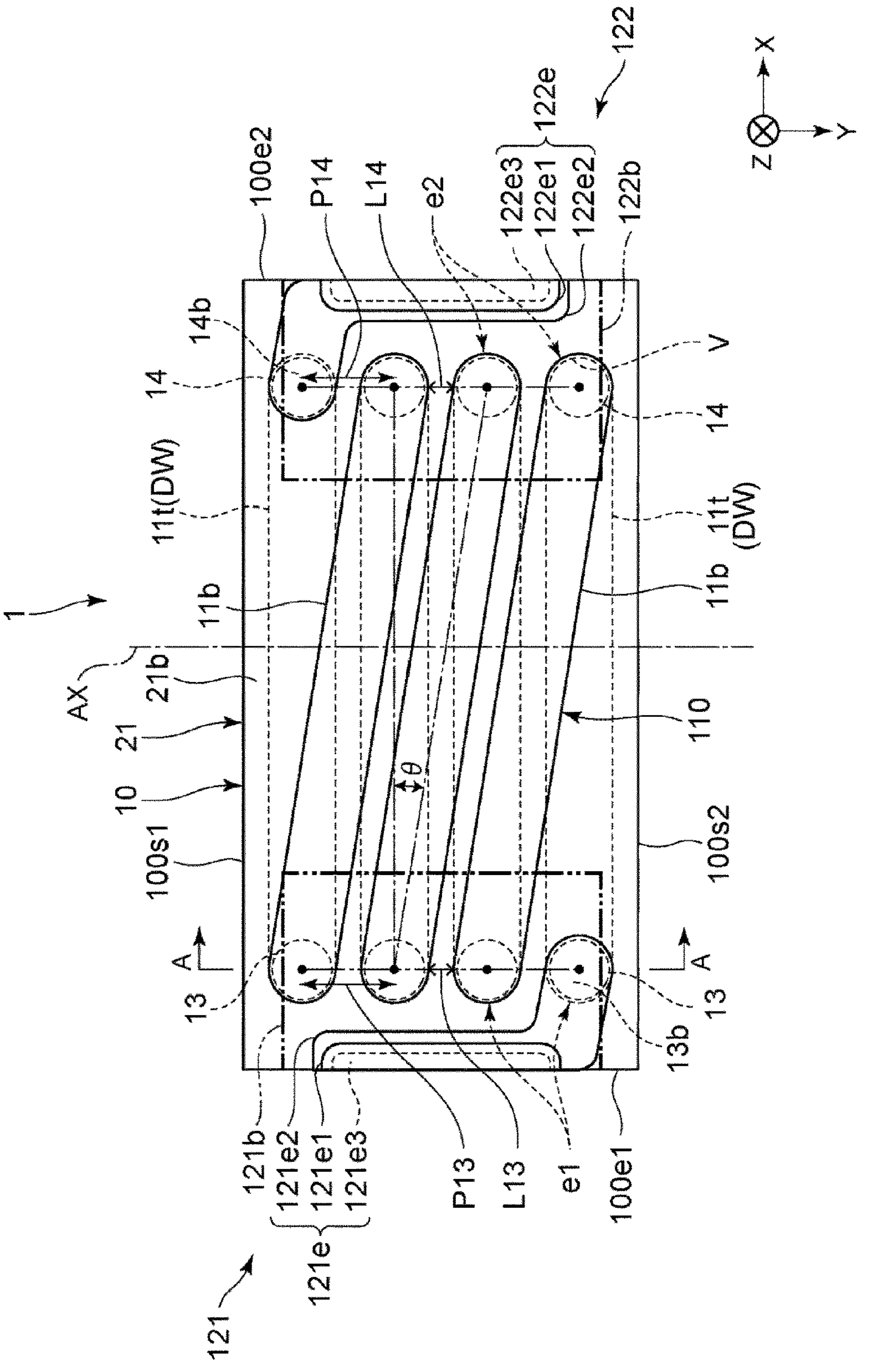
FIG. 2 is a schematic bottom view of the inductor component when viewed from the bottom surface side.
Figure 3:
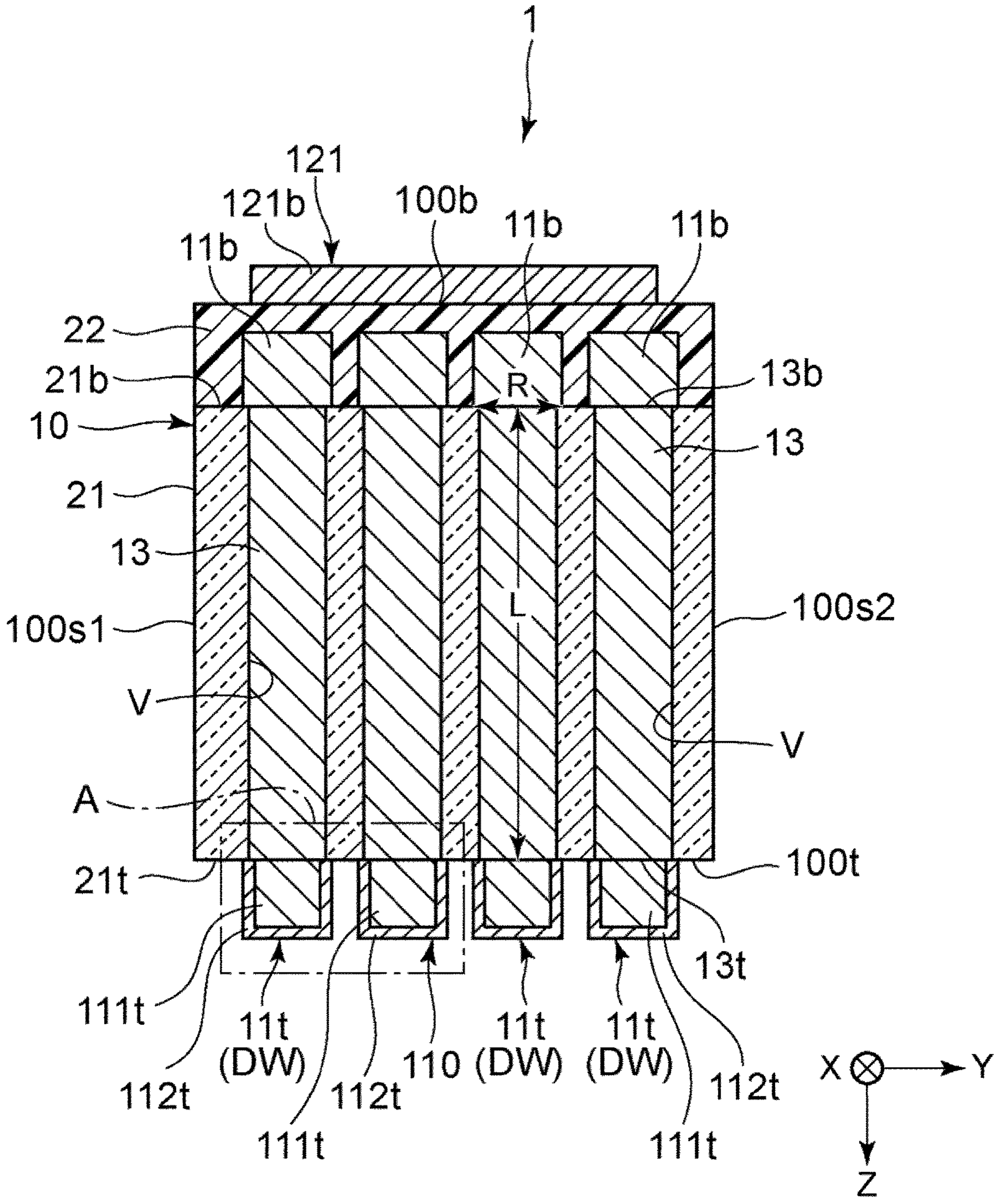
FIG. 3 is a sectional view taken along line A-A of FIG. 2.

An inductor component 1 according to a first embodiment will be described hereinafter. FIG. 1 is a schematic perspective view of the inductor component 1 when viewed from a bottom surface side. FIG. 2 is a schematic bottom view of the inductor component 1 when viewed from the bottom surface side. FIG. 3 is a sectional view taken along line A-A of FIG. 2. In FIG. 2, for convenience, an insulating layer of an element body is omitted, and a part (bottom surface portion) of an external electrode is drawn by a two-dot chain line.

1. Outline Configuration

An outline configuration of the inductor component 1 will be described. The inductor component 1 is, for example, a surface-mount inductor component used in a high-frequency signal transmission circuit. As illustrated in FIGS. 1 to 3, the inductor component 1 includes an element body 10, a coil 110 provided on the element body 10 and wound into a spiral shape along an axis AX, and a first external electrode 121 and a second external electrode 122 provided on the element body 10 and electrically connected to the coil 110. The axis AX of the coil 110 is a straight line passing through a center of an inner diameter portion of the coil 110.

The element body 10 has a length, a width, and a height. The element body 10 has a first end surface **100*e*1 and a second end surface 100*e*2 on both end sides in a length direction, a first side surface 100*s*1 and a second side surface 100*s*2 on both end sides in a width direction, and a bottom surface 100*b* and a top surface 100*t* on both end sides in a height direction. That is, an outer surface 100 of the element body 10 includes the first end surface 100*e*1, the second end surface 100*e*2, the first side surface 100*s*1, the second side surface 100*s*2, the bottom surface 100*b*, and the top surface 100*t***.

Hereinafter, a direction from the first end surface **100*e*1 toward the second end surface 100*e*2 in the length direction (longitudinal direction) of the element body 10 is referred to as an X direction for convenience of the description as illustrated in the drawings. In addition, a direction from the first side surface 100*s*1 toward the second side surface 100*s*2 in the width direction of the element body 10 is referred to as a Y direction. In addition, the height direction of the element body 10, that is, a direction from the bottom surface 100*b* toward the top surface 100*t*** is referred to as a Z direction. The X direction, the Y direction, and the Z direction are directions orthogonal to each other, and form a right-handed system when arranged in the order of X, Y, and Z.

In this specification, the "outer surface 100 of the element body" including the first end surface **100*e*1, the second end surface 100*e*2, the first side surface 100*s*1, the second side surface 100*s*2, the bottom surface 100*b*, and the top surface 100*t* of the element body 10 does not mean a surface simply facing the outer peripheral side of the element body 10, but is a surface serving as a boundary between the outer side and the inner side of the element body 10. In addition, "above the outer surface 100 of the element body 10" does not refer to an absolute unidirectional orientation such as a vertically upward orientation defined in the direction of gravity, but refers to an orientation toward the outer side, with the outer surface 100 as a reference, between the outer side and the inner side having the outer surface 100 as the boundary. Therefore, "above the outer surface 100" is a relative orientation determined by the orientation of the outer surface 100**. In addition, "above" with respect to an element includes not only an upper position away from the element, that is, an upper position with another object on the element or an upper position with a spacing, but also an immediately upper position on the element in contact with the element.

The element body 10 includes a substrate 21 and an insulating layer 22 provided on the substrate 21. The substrate 21 has a bottom surface **21*b* and a top surface 21*t* facing each other in the Z direction. The insulating layer 22 is provided on the bottom surface 21*b* of the substrate 21. The bottom surface 21*b* corresponds to an example of a "first principal surface" described in the claims, and the top surface 21*t*** corresponds to an example of a "second principal surface" described in the claims.

The axis AX of the coil 110 is arranged in parallel to a direction of a shorter dimension among the length, the width, and the height of the element body 10. Here, in the element body 10, the length (dimension in the X direction), the height (Z direction), and the width (dimension in the Y direction) are shorter in this order. Since all of the length, the width, and the height are different, the short dimension refers to any one of the two dimensions (height and width) except for the longest dimension (length). In this embodiment, the short dimension is defined as the width, and the axis AX of the coil 110 is arranged parallel to the width direction of the element body 10.

The coil 110 includes: a plurality of bottom surface wirings **11*b* provided on the bottom surface 21*b* and covered with the insulating layer 22; a plurality of top surface wirings 11*t* provided on the top surface 21*t*; a plurality of first through wirings 13 provided so as to penetrate the substrate 21 from the bottom surface 21*b* to the top surface 21*t* and arranged along the axis AX; and a plurality of second through wirings 14 provided so as to penetrate the substrate 21 from the bottom surface 21*b* to the top surface 21*t*, arranged on the side opposite to the first through wirings 13** with respect to the axis AX, and arranged along the axis AX.

The bottom surface wiring **11*b* corresponds to an example of a "first coil wiring" described in the claims, and the top surface wiring 11*t* corresponds to an example of a "second coil wiring" described in the claims. The bottom surface wiring 11*b*, the first through wiring 13, the top surface wiring 11*t*, and the second through wiring 14** are connected in this order to constitute at least a part of the spiral shape.

The top surface wirings **11*t* include a both-end connecting coil wiring DW. The both-end connecting coil wiring DW is a wiring in which a first end portion e1 and a second end portion e2 are connected to the first through wiring 13 and the second through wiring 14, respectively, among the top surface wirings 11*t*. Therefore, for example, the top surface wiring 11*t* in which the first end portion e1 is directly connected to the first external electrode 121 and also functions as an extended wiring to the first external electrode 121 is not included in the both-end connecting coil wiring DW. In the present embodiment, all the top surface wirings 11*t*** are the both-end connecting coil wirings DW.

In the both-end connecting coil wiring DW, a portion located on the side opposite to the top surface **21*t* of an outer surface of the both-end connecting coil wiring DW is exposed to at least the outside, and an exposed surface contains a corrosion-resistant conductive material. A part of the exposed surface may be made of the corrosion-resistant conductive material, or the entire exposed surface may be made of the corrosion-resistant conductive material. It is preferable that the entire exposed surface be made of the corrosion-resistant conductive material from the viewpoint of further improving the corrosion resistance of the both-end connecting coil wiring DW. In addition, it is preferable that the exposed surface contain a conductive material having a higher corrosion resistance than a conductive material forming the bottom surface wiring 11*b*. Thus, the corrosion resistance of the both-end connecting coil wiring DW (top surface wiring 11***t*) is improved as compared with the bottom surface wiring 11*b*, and reliability of the coil 110 can be enhanced.

Since, at least the portion, located on the side opposite to the top surface 21*t*, of the outer surface of the both-end connecting coil wiring DW is exposed to the outside according to the above configuration, a size of the inductor component 1 in the direction (Z direction) orthogonal to the top surface 21*t* can be reduced as compared with a case where the portion is covered with an insulating layer, and the inductor component 1 can be downsized. Since the exposed surface of the outer surface exposed to the outside contains the corrosion-resistant conductive material, the corrosion resistance of the both-end connecting coil wiring DW can be enhanced to protect the both-end connecting coil wiring DW from deterioration caused by an external environment although the both-end connecting coil wiring DW has the exposed surface. As a result, the reliability of the coil 110 can be secured.

The first external electrode 121 is provided on the bottom surface 100*b* and the first end surface 100*e*1 of the element body 10. Specifically, a part of the first external electrode 121 is provided on the insulating layer 22 above the bottom surface wiring 11*b* to be away from the bottom surface wiring 11*b*, and the other part of the first external electrode 121 is embedded in the first end surface 100*e*1 so as to be exposed from the first end surface 100*e*1.

The second external electrode 122 is provided on the bottom surface 100*b* and the second end surface 100*e*2 of the element body 10. Specifically, a part of the second external electrode 122 is provided on the insulating layer 22 above the bottom surface wiring 11*b* to be away from the bottom surface wiring 11*b*, and the other part of the second external electrode 122 is embedded in the second end surface 100*e*2 so as to be exposed from the second end surface 100*e*2.

2. Configuration of Each Unit (Inductor Component 1)

A volume of the inductor component 1 is preferably 0.08 $mm^3$ or less, and a size of a long side of the inductor component 1 is 0.65 mm or less. The size of the long side of the inductor component 1 refers to the largest value among the length, the width, and the height of the inductor component 1, and refers to the length in the X direction in this embodiment. Since the volume of the inductor component 1 is small and the long side of the inductor component 1 is also short according to the above configuration, the inductor component 1 has a light weight. Therefore, required mounting strength can be obtained when the external electrodes 121 and 122 are small.

Specifically, a size (length (X direction)×width (Y direction)×height (Z direction)) of the inductor component 1 is 0.6 mm×0.3 mm×0.3 mm, 0.4 mm×0.2 mm×0.2 mm, 0.25 mm×0.125 mm×0.120 mm, or the like. In addition, the width and the height are not necessarily equal, and the size of the inductor component 1 may be, for example, 0.4 mm×0.2 mm×0.3 mm or the like.

(Element Body 10)

The element body 10 includes the substrate 21 having the bottom surface 21*b* and the top surface 21*t* on both end sides in the Z direction, and the insulating layer 22 covering the bottom surface 21*b* of the substrate 21. Since the insulating layer 22 covers the bottom surface wiring 11*b* in this manner, the insulating layer 22 can protect the bottom surface wiring 11*b* from solder and environmental stress at the time of mounting. As an insulating property of the insulating layer 22 is increased as compared with the substrate 21, an eddy current can be suppressed, and a Q factor can be improved.

A material of the substrate 21 is preferably glass, and accordingly, the eddy current can be suppressed, and the Q factor can be increased since the glass has a high insulating property. The substrate 21 preferably contains a Si element, and accordingly, thermal stability of the substrate 21 is high, and thus, it is possible to suppress variation in the dimension of the element body 10 the like caused by heat and to reduce variation in electrical characteristics.

The substrate 21 is preferably a single-layer glass plate. Accordingly, the strength of the element body 10 can be secured. In the case of the single-layer glass plate, a dielectric loss is small, and thus, the Q factor at a high frequency can be increased. In addition, there is no sintering process such as a sintered body, and thus, a deformation of the element body 10 during sintering can be suppressed so that a pattern shift can be suppressed, and the inductor component with small inductance tolerance can be provided.

As a material of the single-layer glass plate, a glass plate having photosensitivity represented by Foturan II (registered trademark of Schott AG) is preferable from the viewpoint of a manufacturing method. In particular, the single-layer glass plate preferably contains cerium oxide (ceria: $CeO_2$), and, in this case, the cerium oxide serves as a sensitizer so that processing by photolithography becomes easier.

However, the single-layer glass plate can be processed by machining, such as drilling or sandblasting, dry/wet etching processing using a photoresist and a metal mask, laser processing, or the like, and thus, may be a glass plate having no photosensitivity. In addition, the single-layer glass plate may be obtained by sintering a glass paste or may be formed by a known method such as a float method.

The single-layer glass plate is a single-layer plate-shaped member that does not incorporate a wiring (a part of the coil 110), such as an internal conductor integrated inside a glass body. In particular, the single-layer glass plate has an outer surface as a boundary between the outer side and the inner side of the glass body. A through hole V formed in the single-layer glass plate is also a boundary between the outer side and the inner side of the glass body, and thus, is included in the outer surface 100 of the element body 10.

The single-layer glass plate is basically in an amorphous state, but may have a crystallization portion. For example, in the case of the above-described Foturan II, a dielectric constant of glass in the amorphous state is 6.4, whereas the dielectric constant can be reduced to 5.8 by crystallization. This can reduce a stray capacitance between conductors (between wirings) in the vicinity of the crystallization portion.

The insulating layer 22 is a member that covers a wiring (the bottom surface wiring 11*b*) to protect the wiring from an external force and has a role of preventing damage to the wiring and a role of improving an insulating property of the wiring. The insulating layer 22 is preferably an inorganic film made of an inorganic film made of an oxide, a nitride, or an oxynitride of, for example, silicon or hafnium, which is excellent in the insulating property and thinning. However, the insulating layer 22 may be a resin film made of, for example, epoxy, polyimide, or the like, which is more easily formed. In particular, the insulating layer 22 is preferably made of a material having a low dielectric constant, whereby the stray capacitance formed between the coil 110 and the external electrode 121 or 122 can be reduced in a case where the insulating layer 22 is present between the coil 110 and the external electrode 121 or 122.

The insulating layer 22 can be formed by, for example, laminating a resin film such as ABF GX-92 (manufactured by Ajinomoto Fine-Techno Co., Inc), applying a paste-like resin and thermally curing the resin, or the like.

Preferably, a thickness of the insulating layer 22 is ⅓ or less a thickness of the substrate 21, and the dielectric constant of the insulating layer 22 is smaller than the dielectric constant of the substrate 21. The thickness is the maximum value of a size in a direction orthogonal to the bottom surface 21*b*. Accordingly, the thickness of the insulating layer 22 is made thin, and the inductor component 1 can be downsized. In addition, when the thickness of the insulating layer 22 is reduced and a distance between each of the first and second external electrodes 121 and 122 and the bottom surface wiring 11*b* is shortened, it is possible to decrease a parasitic capacitance between each of the first and second external electrodes 121 and 122 and the bottom surface wiring 11*b* and to increase the Q factor since the dielectric constant of the insulating layer 22 is smaller than the dielectric constant of the substrate 21.

Note that the element body 10 may include a sintered body, that is, the substrate 21 may be a sintered body, and the strength of the element body 10 can be secured. In addition, the inductance acquisition efficiency can be increased by using ferrite or the like for the sintered body.

The element body 10 may further include an insulating film that covers a part of the insulating layer 22 on the side of the bottom surface 21*b*. That is, the insulating film is located at least between the first external electrode 121 and the second external electrode 122 provided on the insulating layer 22, and can more reliably prevent a short circuit between the first external electrode 121 and the second external electrode 122. A material of the insulating film is, for example, the same material as the insulating layer 22.

(Coil 110)

The coil 110 includes: the bottom surface wiring 11*b* arranged above the bottom surface 21*b* of the substrate 21 and covered with the insulating layer 22; the top surface wiring 11*t* arranged above the top surface 21*t* of the substrate 21; and the pair of through wirings 13 and 14 penetrating the substrate 21 from the bottom surface 21*b* to the top surface 21*t* and arranged on opposite sides with respect to the axis AX. The bottom surface wiring 11*b*, the first through wiring 13, the top surface wiring 11*t*, and the second through wiring 14 are sequentially connected to constitute at least a part of the coil 110 wound in the axis AX direction.

According to the above configuration, the coil 110 is the coil 110 having a so-called helical shape, and thus, it is possible to reduce a region where the bottom surface wiring 11*b*, the top surface wiring 11*t*, and the through wirings 13 and 14 are disposed side by side along a winding direction of the coil 110 in a section orthogonal to the axis AX, and the stray capacitance in the coil 110 can be reduced.

Here, the helical shape refers to a shape in which the number of turns of the entire coil is equal to or larger than one turn and the number of turns of the coil in the section orthogonal to the axis is smaller than one turn. Regarding the number of turns of the coil in the section orthogonal to the axis, "being equal to or larger than one turn" refers to a state in which the wiring of the coil has portions that are adjacent to each other in the radial direction when viewed from the axial direction and disposed side by side in the winding direction in the section orthogonal to the axis, and "being smaller than one turn" refers to a state in which the wiring of the coil does not have portions that are adjacent in the radial direction when viewed from the axial direction and are disposed side by side in the winding direction in the section orthogonal to the axis. Note that the portions of the wiring disposed side by side include not only an extending portion extending in the winding direction of the wiring but also a pad portion connected to an end portion of the extending portion and having a width larger than a width of the extending portion.

The axis AX of the coil 110 is arranged in parallel to the direction of the width, which is the shortest dimension among the length, the width, and the height of the element body 10. Accordingly, the inner diameter of the coil 110 can be made larger, and the inductance acquisition efficiency can be further enhanced.

Preferably, on the bottom surface 21*b* as illustrated in FIG. 2, a line (dashed-dotted line) connecting the centers of gravity of end surfaces 13*b* of the plurality of first through wirings 13 is parallel to the axis AX of the coil 110, and a line (dashed-dotted line) connecting the centers of gravity of end surfaces 14*b* of the plurality of second through wirings 14 is parallel to the axis AX of the coil 110. Accordingly, the inner diameter of the coil can be made constantly large along the axial direction, and the inductance acquisition efficiency can be further enhanced. More preferably, on the top surface 21*t*, a line connecting the centers of gravity of end surfaces 13*t* of the plurality of first through wirings 13 is parallel to the axis AX of the coil 110, and a line connecting the centers of gravity of end surfaces 14*t* of the plurality of second through wirings 14 is parallel to the axis AX of the coil 110.

The bottom surface wirings 11*b* extend only in one direction. Specifically, the bottom surface wirings 11*b* extend in the X direction to be slightly inclined in the Y direction. The plurality of bottom surface wirings 11*b* are arranged side by side along the Y direction to be parallel to each other. Here, when a modified illumination, such as an annular illumination or a dipole illumination, is used in a photolithography process, pattern resolution in a specific direction can be enhanced to form a finer pattern. According to the above configuration, since the bottom surface wirings 11*b* extend in one direction, the fine bottom surface wirings 11*b* can be formed by using, for example, the modified illumination in the photolithography process, and the inductor component 1 can be downsized. Specifically, when the bottom surface wirings 11*b* extend only in one direction, a spacing between lines of the bottom surface wirings 11*b* is in a direction orthogonal to the one direction, and thus, the formation accuracy of the spacing between the lines of the bottom surface wirings 11*b* can be improved more than usual by enhancing the pattern resolution in such an orthogonal direction.

The top surface wirings 11*t* extend only in one direction. Specifically, the top surface wiring 11*t* has a shape extending in the X direction. The plurality of top surface wirings 11*t* are arranged side by side along the Y direction to be parallel to each other. According to the above configuration, since the top surface wirings 11*t* extend only in one direction, the fine top surface wirings 11*t* can be formed by using, for example, the modified illumination in the photolithography process, and the inductor component 1 can be downsized.

As described above, in the present embodiment, all the top surface wirings 11*t* are the both-end connecting coil wirings DW each of which has the first end portion e1 connected to the first through wiring 13 and the second end portion e2 connected to the second through wiring 14. The portion of the outer surface of the both-end connecting coil wiring DW located on the opposite side to the top surface 21*t* is exposed to at least the outside, and the exposed surface of the outer surface exposed to the outside contains the corrosion-resistant conductive material.

As illustrated in FIG. 3, each of the both-end connecting coil wirings DW includes a main body 111*t* and a covering layer 112*t* covering the main body 111*t*. The main body 111*t* is provided on the top surface 21*t* and extends in the X direction. A shape of the main body 111*t* is not particularly limited. In the present embodiment, the main body 111*t* has a rectangular shape in a section orthogonal to the X direction. A conductive material of the main body 111*t* is preferably the same as that of the bottom surface wiring 11*b*. Thus, the main body 111*t* can also be manufactured at the time of manufacturing the bottom surface wiring 11*b*, and the manufacturing process can be simplified. The conductive material of the main body 111*t* is, for example, copper.

The covering layer 112*t* covers the entire outer surface other than an outer surface on the side of the top surface 21*t* out of the outer surface of the main body 111*t*. The covering layer 112*t* contains a corrosion-resistant conductive material. "Having a corrosion resistance" means having resistance to metal deterioration, that is, rust. This expression "having a corrosion resistance" includes not only a case where oxidation itself hardly occurs due to a small ionization tendency, but also a case where further corrosion is suppressed as a metal surface is bonded to oxygen to form a passivation film. Examples of the corrosion-resistant conductive material include Au, Pt, Ag, or an alloy thereof which has a low ionization tendency, Ti, Al, Cr, Ta, or an alloy thereof which forms a passivation film, a Ni alloy, and the like. Thus, the corrosion resistance of the both-end connecting coil wiring DW can be improved. In the present embodiment, a conductive material forming the covering layer 112*t* is the same as the conductive material of the first external electrode 121 and the second external electrode 122. Thus, although the both-end connecting coil wiring DW has the exposed surface, the resistance of the both-end connecting coil wiring DW to the external environment can be made equal to that of the first and second external electrodes 121 and 122, and the both-end connecting coil wiring DW can be protected from the deterioration caused by the external environment. As a result, the reliability of the inductor component 1 can be secured. In addition, at least a part of the both-end connecting coil wiring DW (top surface wiring 11*t*) can be simultaneously formed at the time of manufacturing the first external electrode 121 and the second external electrode 122, and the both-end connecting coil wiring DW can be easily manufactured. With the above configuration, out of the outer surface of the both-end connecting coil wiring DW, the entire outer surface other than the outer surface on the side of the top surface 21*t* becomes the exposed surface to the outside, and this exposed surface contains the corrosion-resistant conductive material.

Note that the entire covering layer 112*t* may be made of a corrosion-resistant conductive material. Thus, the corrosion resistance of the both-end connecting coil wiring DW can be effectively enhanced. In addition, the covering layer 112*t* may include a plurality of layers. In this case, it is preferable that each layer contain the corrosion-resistant conductive material. However, at least the outermost layer contains the corrosion-resistant conductive material in order to secure the corrosion resistance of the both-end connecting coil wiring DW. Examples of the plurality of layers include Ni/Au and the like.

The first through wiring 13 is arranged on the side of the first end surface 100*e*1 with respect to the axis AX in the through hole V of the element body 10, and the second through wiring 14 is arranged on the side of the second end surface 100*e*2 with respect to the axis AX in the through hole V of the element body 10. The first through wiring 13 and the second through wiring 14 extend in directions orthogonal to the bottom surface 21*b* and the top surface 21*t* (the bottom surface 100*b* and the top surface 100*t*), respectively. Accordingly, lengths of the first through wiring 13 and the second through wiring 14 can be shortened, and thus, direct current resistance (Rdc) can be suppressed. The plurality of first through wirings 13 and the plurality of second through wirings 14 are arranged side by side along the Y direction to be parallel to each other.

The bottom surface wiring 11*b* and the main body 111*t* of the top surface wiring 11*t* are made of conductive materials having a high conductivity, such as copper, silver, gold, or an alloy thereof. The bottom surface wiring 11*b* and the main body 111*t* of the top surface wiring 11*t* may be a metal film formed by plating, vapor deposition, sputtering, or the like, or may be a metal sintered body portion obtained by applying and sintering a conductor paste. In addition, the bottom surface wiring 11*b* and the main body 111*t* of the top surface wiring 11*t* may have a multilayer structure in which a plurality of metal layers are laminated. A thickness of the bottom surface wiring 11*b* and a thickness of the main body 111*t* of the top surface wiring 11*t* are preferably 5 μm or more and 50 μm or less (i.e., from 5 μm to 50 μm).

The first through wiring 13 and the second through wiring 14 can be formed in the through hole V, formed in advance in the element body 10, using the materials and manufacturing methods exemplified for the bottom surface wiring 11*b* and the top surface wiring 11*t*. Preferably, at least one of the first through wiring 13 and the second through wiring 14 includes a plurality of conductor layers. Accordingly, a type of the conductor layer can be selected, and the through wiring can be formed in accordance with an application. For example, the through wirings 13 and 14 can be formed by combining a conductor layer of TiN, Ti, Ni, or the like, which has a high barrier property and a high degree of close contact but has a low conductivity, with a conductor layer of Cu, Ag, or the like which has a high conductivity. In addition, the through wirings 13 and 14 which are inexpensive and have low Rdc can be formed by filling a cavity portion after conformal plating with a conductive paste containing Cu or Ag filler by a printing method or the like. Note that each of the through wirings 13 and 14 may have a void in order to mitigate stress.

Preferably, the bottom surface wiring 11*b*, the main body 111*t* of the top surface wiring 11*t*, the first through wiring 13, and the second through wiring 14 contain copper as a main component. Accordingly, since inexpensive and highly conductive copper is used as the material of the wiring, mass productivity of the inductor component 1 can be improved, and the Q factor can be increased.

Preferably, a first end portion of the bottom surface wiring 11*b* and the first end portion e1 of the top surface wiring 11*t* overlap each other when viewed from the direction orthogonal to the bottom surface 21*b* as illustrated in FIG. 2, and an angle θ formed by the bottom surface wiring 11*b* and the top surface wiring 11*t* is 5 degrees or more and 45 degrees or less (i.e., from 5 degrees to 45 degrees). The angle θ is an angle between a center line (one-dot chain line) of a width of the bottom surface wiring 11*b* and a center line (one-dot chain line) of a width of the top surface wiring 11*t* when viewed from the direction orthogonal to the bottom surface 21*b*.

According to the above configuration, the coil 110 is densely wound since the angle θ is 45 degrees or less, and thus, the inductance can be improved. Since the angle θ is 5 degrees or more, a spacing is secured between the adjacent bottom surface wirings 11*b*, between the adjacent top surface wirings 11*t*, between the adjacent first through wirings 13, or between the adjacent second through wirings 14, and the occurrence of the short circuit can be reduced. Note that the angle θ may be 5 degrees or more and 45 degrees or less (i.e., from 5 degrees to 45 degrees) in at least one set of the bottom surface wiring 11*b* and the top surface wiring 11*t* among all of the bottom surface wirings 11*b* and the top surface wirings 11*t*, and preferably, the angle θ may be 5 degrees or more and 45 degrees or less (i.e., from 5 degrees to 45 degrees) in all the sets of the bottom surface wirings 11*b* and the top surface wirings 11*t*.

Preferably, as illustrated in FIG. 2, the number of the first through wirings 13 and the number of the second through wirings 14 are the same, and the first through wirings 13 and the second through wirings 14 are line-symmetric with respect to the axis AX of the coil 110 when viewed from the direction orthogonal to the bottom surface 21*b*. In this embodiment, each of the number of the first through wirings 13 and the number of the second through wirings 14 is four.

According to the above configuration, in a case where the number of the first through wirings 13 and the number of the second through wirings 14 are the same, the size of the coil 110 in the axis AX direction can be reduced as compared with a case where the both are asymmetric with respect to the axis AX of the coil 110, and the inductor component 1 can be downsized.

Preferably, as illustrated in FIG. 3, a length L of the first through wiring 13 in an extending direction is five times or more a circle-equivalent diameter R of the end surface 13*b* of the first through wiring 13 on the bottom surface 21*b*. Similarly, a length L of the second through wiring 14 in an extending direction is five times or more a circle-equivalent diameter R of the end surface 14*b* of the second through wiring 14 on the bottom surface 21*b*. Accordingly, aspect ratios of the first through wiring 13 and the second through wiring 14 can be increased, and thus, the inner diameter of the coil 110 can be increased, and the inductance acquisition efficiency can be further increased. Note that it is more preferable that the length L of the first through wiring 13 in the extending direction be five times or more a circle-equivalent diameter R of the end surface 13*t* of the first through wiring 13 on the top surface 21*t*. Similarly, it is more preferable that the length L of the second through wiring 14 in the extending direction be five times or more a circle-equivalent diameter R of the end surface 14*t* of the second through wiring 14 on the top surface 21*t*.

Figure 4:
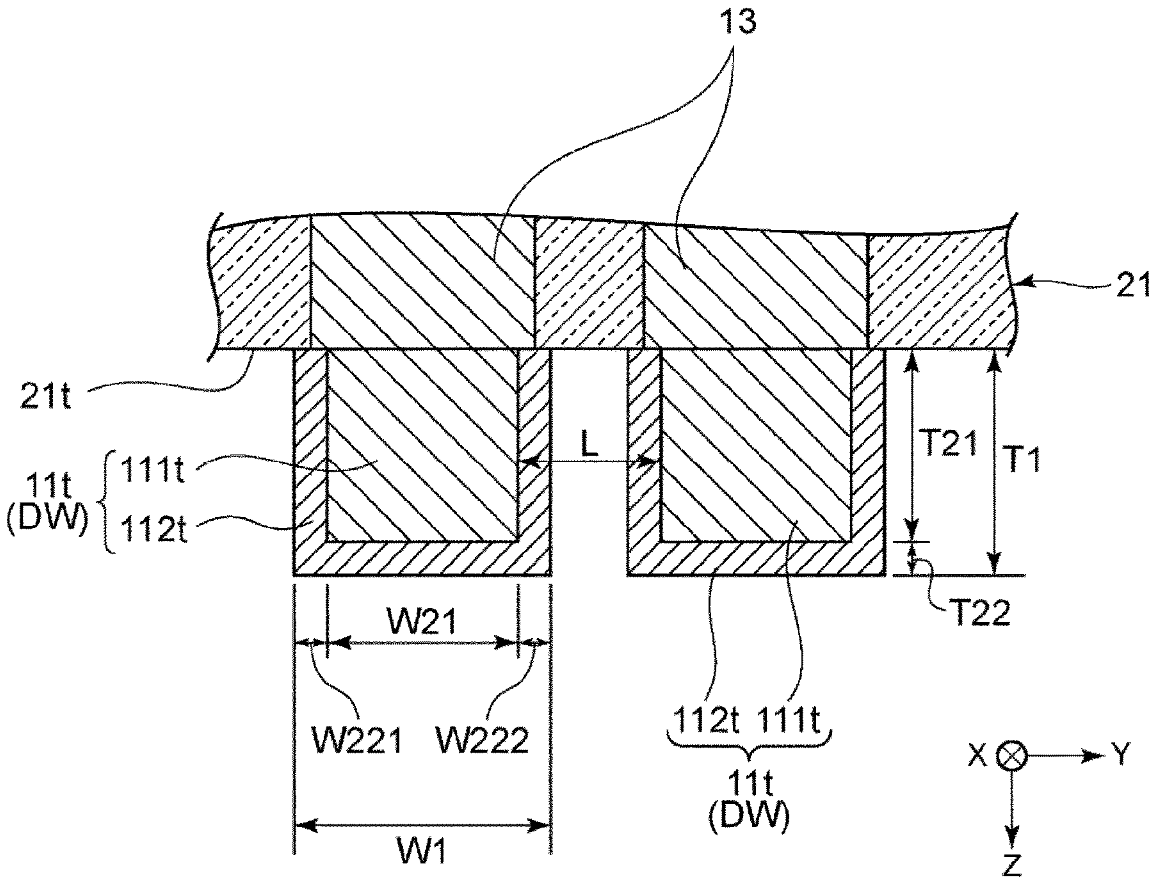
FIG. 4 is an enlarged view of a region A in FIG. 3.

FIG. 4 is an enlarged view of a region A in FIG. 3. When a line width of the top surface wiring 11*t* is W1, a line width of the main body 111*t* is W21, a width of the covering layer 112*t* covering the outer surface on one side in a width direction of the main body 111*t* is W221, and a width of the covering layer 112*t* covering the outer surface on the other side in the width direction of the main body 111*t* is W222 as illustrated in FIG. 4, W1>W21>W221+W222 is preferably satisfied. Here, the "width direction" refers to a direction parallel to the top surface 21*t* in a section orthogonal to an extending direction (the X direction) of the top surface wiring 11*t*. The "width of the covering layer 112*t* covering the outer surface on one side in the width direction of the main body 111*t*" refers to a length of the covering layer 112*t*, which covers the outer surface on one side in the width direction of the main body 111*t*, in a direction parallel to the top surface 21*t* in the section orthogonal to the extending direction of the top surface wiring 11*t*. Similarly, the "width of the covering layer 112*t* covering the outer surface on the other side in the width direction of the main body 111*t*" refers to a length of the covering layer 112*t*, which covers the outer surface on the other side in the width direction of the main body 111*t*, in the direction parallel to the top surface 21*t* in the section orthogonal to the extending direction of the top surface wiring 11*t*.

According to the above configuration, since "W1>W21" is satisfied, a risk of a short circuit of the top surface wiring 11*t* can be reduced. In addition, since "W21>W221+W222" is satisfied, the proportion of the main body 111*t* occupying in the top surface wiring 11*t* increases. Therefore, when a material having a low resistivity is used as the conductive material of the main body 111*t*, the resistance of the top surface wiring 11*t* can be reduced.

In addition, when a thickness of the top surface wiring 11*t* is T1, the thickness of the main body 111*t* is T21, and a thickness of the covering layer 112*t* in the direction (Z direction) orthogonal to the top surface 21*t* is T22, T1>T21>2×T22 is preferably satisfied. Here, the "thickness of the covering layer 112*t* in the direction orthogonal to the top surface 21*t*" refers to a thickness of a portion of the covering layer 112*t* overlapping the main body 111*t* in the direction when viewed from the direction orthogonal to the top surface 21*t* (in other words, the thickness in the direction of the covering layer 112*t* present immediately above the main body 111*t*).

According to the above configuration, since "T1>T21" is satisfied, the size of the inductor component 1 in the direction orthogonal to the top surface 21*t* can be further reduced, and the inductor component 1 can be further downsized. In addition, in the photolithography process, a spacing (denoted by reference sign L in FIG. 4) of a gap between the main bodies 111*t* adjacent to each other in the Y direction is preferably the same as the thickness T21 of the main body 111*t* in order to enhance resolution. In a case where the spacing of the gap between the adjacent main bodies 111*t* is set to be the same as the thickness T21, the short circuit between the top surface wirings 11*t* can be suppressed since "T21>2×T22" is satisfied (that is, the spacing of the gap between the main bodies 111*t* adjacent to each other in the Y direction is larger than twice the thickness T22 of the covering layer 112*t*) according to the above configuration.

(First External Electrode 121 and Second External Electrode 122)

The first external electrode 121 is provided on the side of the first end surface 100*e*1 with respect to the center of the element body 10 in the X direction so as to be exposed from the outer surface 100 of the element body 10. The second external electrode 122 is provided on the side of the second end surface 100*e*2 with respect to the center of the element body 10 in the X direction so as to be exposed from the outer surface 100 of the element body 10.

The first external electrode 121 is connected to a first end of the coil 110, and the second external electrode 122 is connected to a second end of the coil 110. Each of the first external electrode 121 and the second external electrode 122 may be made of a single-layer conductive material or may be made of a plurality of layers of conductive materials. In the case of the single-layer conductive material, the first external electrode 121 and the second external electrode 122 are preferably made of the same conductive material as the covering layer 112*t* of the top surface wiring 11*t*, but may be made of different conductive materials. In the case of the plurality of layers of conductive materials, for example, it is preferable to include an underlying layer made of the same material as the coil 110 and a plating layer covering the underlying layer. The plating layer is preferably made of the same conductive material as the covering layer 112*t*.

The first external electrode 121 is provided to be continuous with the first end surface **100*e*1 and the bottom surface 100*b*. According to the above configuration, the first external electrode 121 is a so-called L-shaped electrode, and thus, a solder fillet can be formed on the first external electrode 121 when the inductor component 1 is mounted on a mounting substrate. Thus, the mounting strength of the inductor component 1 can be improved, and a mounting attitude of the inductor component 1** can be further stabilized.

The first external electrode 121 has a first end surface portion **121*e* provided on the first end surface 100*e*1 and a first bottom surface portion 121*b* provided on the bottom surface 100*b*. The first end surface portion 121*e* and the first bottom surface portion 121*b* are connected. The first end surface portion 121*e* is embedded in the first end surface 100*e*1 so as to be exposed from the first end surface 100*e*1. The first bottom surface portion 121*b* is arranged on the bottom surface 100*b* so as to protrude from the bottom surface 100*b*. The first end surface portion 121*e* is connected to the first through wiring 13 of the coil 110**.

The first end surface portion **121*e* has a first portion 121*e*1, a second portion 121*e*2, and a third portion 121*e*3 sequentially connected along the Z direction. The first portion 121*e*1 is connected to the first bottom surface portion 121*b* on the bottom surface 100*b*. The second portion 121*e*2 is connected to the first through wiring 13 in the element body 10. The third portion 121*e*3 is exposed from the substrate 21**.

The second external electrode 122 is provided to be continuous with the second end surface **100*e*2 and the bottom surface 100*b*. According to the above configuration, the second external electrode 122 is a so-called L-shaped electrode, and thus, a solder fillet can be formed on the second external electrode 122 when the inductor component 1 is mounted on the mounting substrate. Thus, the mounting strength of the inductor component 1 can be improved, and a mounting attitude of the inductor component 1** can be further stabilized.

The second external electrode 122 has a second end surface portion **122*e* provided on the second end surface 100*e*2 and a second bottom surface portion 122*b* provided on the bottom surface 100*b*. The second end surface portion 122*e* and the second bottom surface portion 122*b* are connected. The second end surface portion 122*e* is connected to the second through wiring 14 of the coil 110. The second end surface portion 122*e* is embedded in the second end surface 100*e*2 so as to be exposed from the second end surface 100*e*2. The second bottom surface portion 122*b* is arranged on the bottom surface 100*b* so as to protrude from the bottom surface 100*b***.

The second end surface portion **122*e* has a first portion 122*e*1, a second portion 122*e*2, and a third portion 122*e*3 sequentially connected along the Z direction. The first portion 122*e*1 is connected to the second bottom surface portion 122*b* on the bottom surface 100*b*. The second portion 122*e*2 is connected to the second through wiring 14 in the element body 10. The third portion 122*e*3 is exposed from the substrate 21**.

According to the inductor component 1, the entire outer surface other than the outer surface on the side of the top surface **21*t* out of the outer surface of the both-end connecting coil wiring DW (top surface wiring 11*t*) is the exposed surface. Therefore, the portion, located on the side opposite to the top surface 21*t*, of the outer surface of the both-end connecting coil wiring DW is exposed to the outside, and the size of the inductor component 1 in the direction orthogonal to the top surface 21*t* can be reduced as compared with the case where the portion is covered with an insulating layer, and the inductor component 1 can be downsized. Since the exposed surface exposed to the outside contains the corrosion-resistant conductive material, when the both-end connecting coil wiring DW (top surface wiring 11*t*) has the exposed surface, the corrosion resistance of the both-end connecting coil wiring DW can be enhanced to protect the both-end connecting coil wiring DW from deterioration caused by an external environment. As a result, the reliability of the coil 110** can be secured.

Preferably, the corrosion-resistant conductive material is the same as the conductive material forming the outer surfaces of the first external electrode 121 and the second external electrode 122.

According to the above configuration, although the both-end connecting coil wiring DW has the exposed surface, the resistance of the both-end connecting coil wiring DW to the external environment can be made equal to that of the first and second external electrodes 121 and 122, and the both-end connecting coil wiring DW can be protected from the deterioration caused by the external environment. As a result, the reliability of the inductor component 1 can be secured. In addition, at least a part of the top surface wiring **11*t* can be simultaneously formed at the time of manufacturing the first external electrode 121 and the second external electrode 122, and the top surface wiring 11*t* can be easily manufactured. In addition, stability to the external environment can be secured since the corrosion-resistant conductive material is the same as the conductive material forming the outer surfaces of the first external electrode 121 and the second external electrode 122**.

Preferably, the bottom surface wiring **11*b* includes one or more conductive layers, the both-end connecting coil wiring DW includes two or more conductive layers, and the number of the conductive layers of the both-end connecting coil wiring DW is larger than the number of the conductive layers of the bottom surface wiring 11*b***.

According to the above configuration, the number of the conductive layers of the bottom surface wiring **11*b* can be made small, the bottom surface wiring 11*b*** can be easily manufactured.

Preferably, each of the both-end connecting coil wiring DW and the first and second external electrodes 121 and 122 has a plurality of conductive layers including a conductive layer containing copper as a main component.

According to the above configuration, Rdc (direct current resistance) can be suppressed since each of the both-end connecting coil wiring DW and the first and second external electrodes 121 and 122 contains copper having a low resistivity.

Preferably, the corrosion-resistant conductive material is the same as the conductive material forming the outer surfaces of the first and second external electrodes 121 and 122, and a conductive material forming the outer surface of the bottom surface wiring **11*b* is different from the corrosion-resistant conductive material and the conductive material forming the outer surfaces of the first and second external electrodes 121 and 122**.

According to the above configuration, since the corrosion-resistant conductive material is the same as the conductive material forming the outer surfaces of the first and second external electrodes 121 and 122, at least a part of the top surface wiring **11*t* can be simultaneously formed at the time of manufacturing the first and second external electrodes 121 and 122, and the top surface wiring 11*t* can be easily manufactured. In addition, stability to the first and second external electrodes 121 and 122 can be secured. In addition, it is unnecessary to cover the bottom surface wiring 11***b* with the same conductive material as the corrosion-resistant conductive material at the time of forming the bottom surface wiring 11*b* since the conductive material forming the outer surface of the bottom surface wiring 11*b* is different from the corrosion-resistant conductive material and the conductive material forming the outer surfaces of the first and second external electrodes 121 and 122. Therefore, material cost can be reduced.

Preferably, a conductive material as a main component of the bottom surface wiring 11*b* and a conductive material as a main component of the top surface wiring 11*t* are the same as a conductive material of at least one of the first through wiring 13 and the second through wiring 14.

Here, the main component of the bottom surface wiring 11*b* refers to the conductive material having the largest occupied area in a section orthogonal to an extending direction of the bottom surface wiring 11*b*. The main component of the top surface wiring 11*t* is also similarly defined.

According to the above configuration, a coefficient of linear expansion of the entire coil 110 can be made uniform, and thus, it is possible to suppress the damage of the coil 110 caused by an expansion difference between the wirings.

Preferably, the top surface wiring 11*t* includes the main body 111*t*, made of the same conductive material as the bottom surface wiring 11*b*, and the covering layer 112*t*, and the line width of the main body 111*t* is smaller than a line width of the bottom surface wiring 11*b*.

Here, the line width of the bottom surface wiring 11*b* refers to a length of the bottom surface wiring 11*b* in a direction parallel to the bottom surface 21*b* in the section orthogonal to the extending direction of the bottom surface wiring 11*b*. The line width of the main body 111*t* refers to a length of the main body 111*t* in the direction parallel to the top surface 21*t* in the section orthogonal to the extending direction (X direction) of the top surface wiring 11*t*. Specifically, the section orthogonal to the extending direction of the bottom surface wiring 11*b* is a plane that is orthogonal to the extending direction of the bottom surface wiring 11*b* and passes through the center of the bottom surface wiring 11*b* in the extending direction. Similarly, the section orthogonal to the extending direction of the top surface wiring 11*t* is a plane that is orthogonal to the extending direction of the top surface wiring 11*t* and passes through the center of the top surface wiring 11*t* in the extending direction.

According to the above configuration, the risk of the short circuit of the top surface wiring 11*t* can be reduced.

Preferably, the top surface wiring 11*t* includes the main body 111*t*, made of the same conductive material as the bottom surface wiring 11*b*, and the covering layer 112*t*, and the thickness of the main body 111*t* is smaller than the thickness of the bottom surface wiring 11*b*.

Here, the thickness of the bottom surface wiring 11*b* refers to the length of the bottom surface wiring 11*b* in the direction orthogonal to the bottom surface 21*b* in the section orthogonal to the extending direction of the bottom surface wiring 11*b*. The thickness of the main body 111*t* refers to a length of the main body 111*t* in the direction orthogonal to the top surface 21*t* in the section orthogonal to the extending direction of the top surface wiring 11*t*.

According to the above configuration, the size of the inductor component 1 in the direction orthogonal to the top surface 21*t* can be further reduced, and the inductor component 1 can be further downsized.

Preferably, a pitch (denoted by reference sign P13 in FIG. 2) between the adjacent first through wirings 13 is 10 μm or more and 150 μm or less (i.e., from 10 μm to 150 μm), and a pitch (denoted by reference sign P14 in FIG. 2) between the adjacent second through wirings 14 is 10 μm or more and 150 μm or less (i.e., from 10 μm to 150 μm).

Here, the pitch between the adjacent first through wirings 13 is a distance between center lines of the adjacent first through wirings 13. The pitch between the adjacent second through wirings 14 is also similarly defined.

According to the above configuration, it is possible to suppress short circuits between the adjacent bottom surface wirings 11*b*, between the adjacent top surface wirings 11*t*, between the adjacent first through wirings 13, and between the adjacent second through wirings 14 since the pitch between the adjacent first through wirings 13 is 10 μm or more and the pitch between the adjacent second through wirings 14 is 10 μm or more. In addition, the coil length can be shortened, and the inductance acquisition efficiency can be improved since the pitch between the adjacent first through wirings 13 is 150 μm or less and the pitch between the adjacent second through wirings 14 is 150 μm or less.

Preferably, a minimum distance (denoted by reference sign L13 in FIG. 2) between the end surfaces 13*b* of the adjacent first through wirings 13 when viewed from the direction orthogonal to the bottom surface 21*b* is 5 μm or more, and a minimum distance (denoted by reference sign L14 in FIG. 2) between the end surfaces 14*b* of the adjacent second through wirings 14 is 5 μm or more.

According to the above configuration, it is possible to further suppress the short circuits between the adjacent first through wirings 13 and between the adjacent second through wirings 14.

Preferably, when a conductive material having magnetism is used as a conductive material of at least one of the first and second external electrodes 121 and 122 and the top surface wiring (second coil wiring) 11*t*, at least one of a thickness and a width of a conductive layer made of the conductive material is 1 μm or less.

Here, the conductive material having magnetism is, for example, Fe, Co, or Ni. For example, when a conductive material containing Ni or a Ni alloy is used for the external electrode, an electromigration resistance of the external electrode can be improved. In addition, the "thickness" and the "width" of the conductive layer may be defined in the same manner as T and W illustrated in FIG. 4. According to the above configuration, a size of the conductive layer is small when the conductive material having magnetism is used for the external electrode, and thus, a high-frequency loss can be reduced, and the electromigration resistance can also be improved.

(Method of Manufacturing Inductor Component 1)

Next, a method of manufacturing the inductor component 1 will be described with reference to FIGS. 5A to 5G. FIGS. 5A to 5G are views corresponding to the section taken along line A-A of FIG. 2.

Figure 5A:
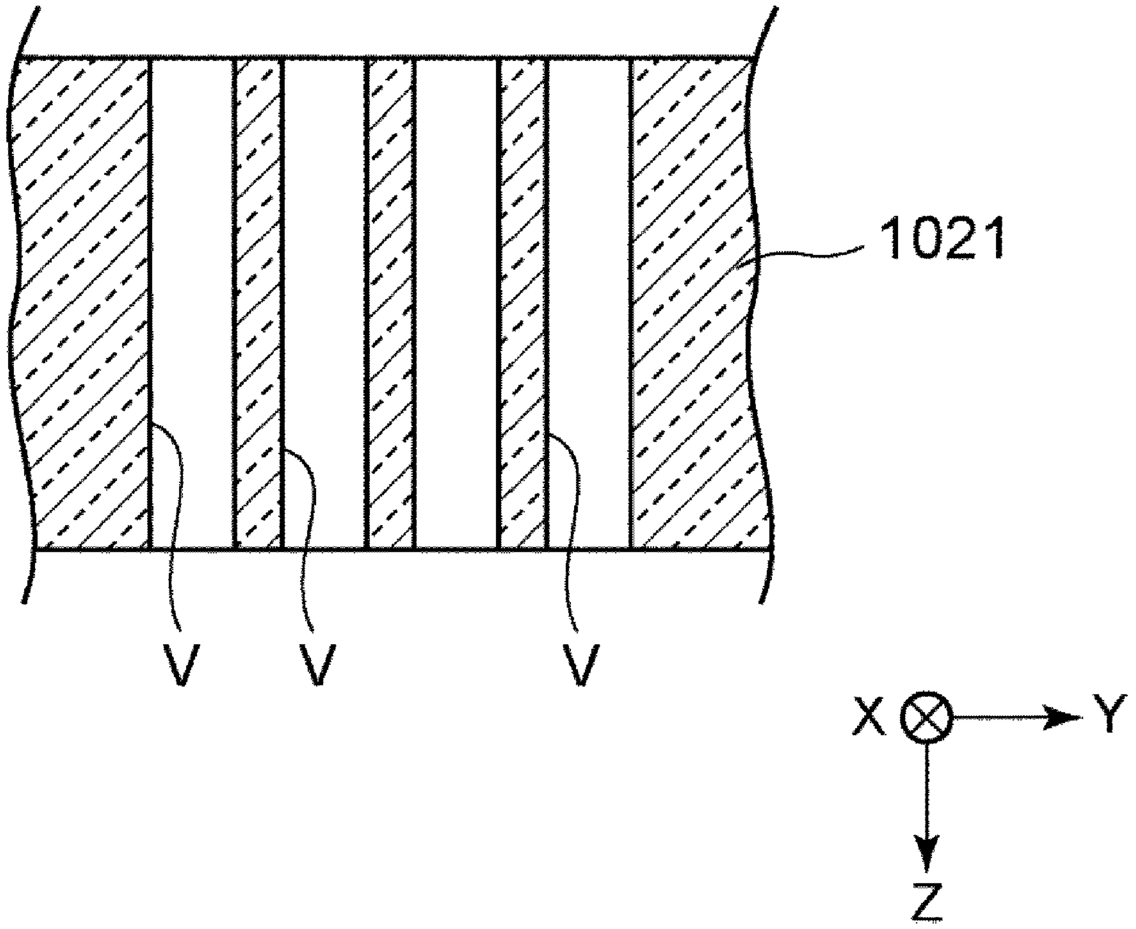
FIG. 5A is a schematic sectional view for describing a method of manufacturing the inductor component.

As illustrated in FIG. 5A, a glass substrate 1021 to be the substrate 21 is prepared. The glass substrate 1021 is a single-layer glass plate. The plurality of through holes V are provided at predetermined positions on the glass substrate 1021. At this time, the glass substrate 1021 is opened by laser processing, or may be opened by dry or wet etching processing or machining such as drilling.

Figure 5B:
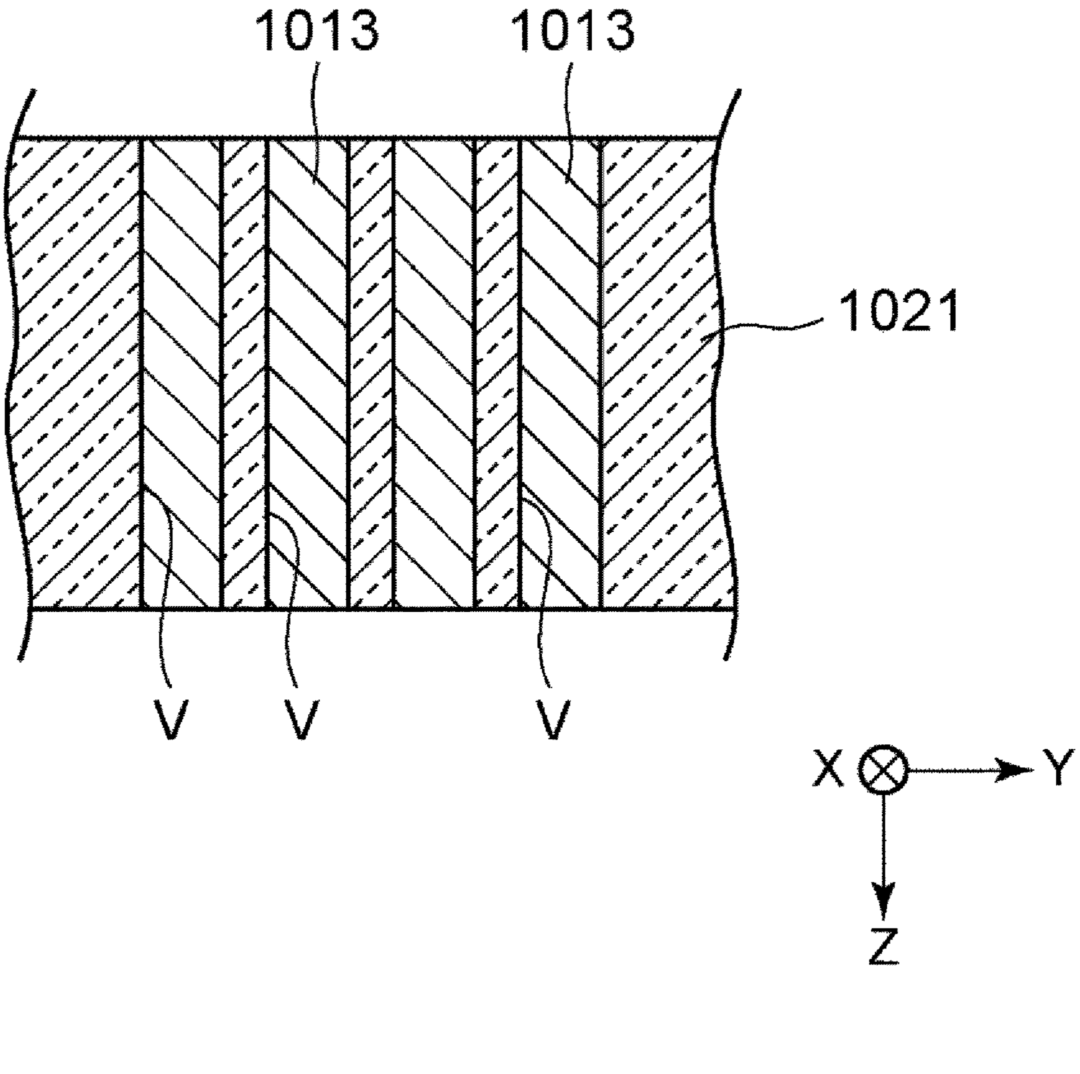
FIG. 5B is a schematic sectional view for describing the method of manufacturing the inductor component.

As illustrated in FIG. 5B, a seed layer (not illustrated) is provided on the entire surface of the glass substrate 1021, a copper layer is formed on the seed layer by electrolytic plating, and the seed layer and the copper layer on the entire surface of the glass substrate 1021 except for the inside of the through hole V are removed by wet etching or dry etching. Thus, a through conductor layer 1013 to be the first through wiring 13 is formed in the through hole V of the glass substrate 1021. At this time, a through conductor layer to be the second through wiring 14 is similarly formed in the through hole V although not illustrated. In addition, a third portion conductor layer to be the third portion 121*e*3 of the first end surface portion 121*e* is formed, and a third portion conductor layer to be the third portion 122*e*3 of the second end surface portion 122*e* is formed.

Figure 5C:
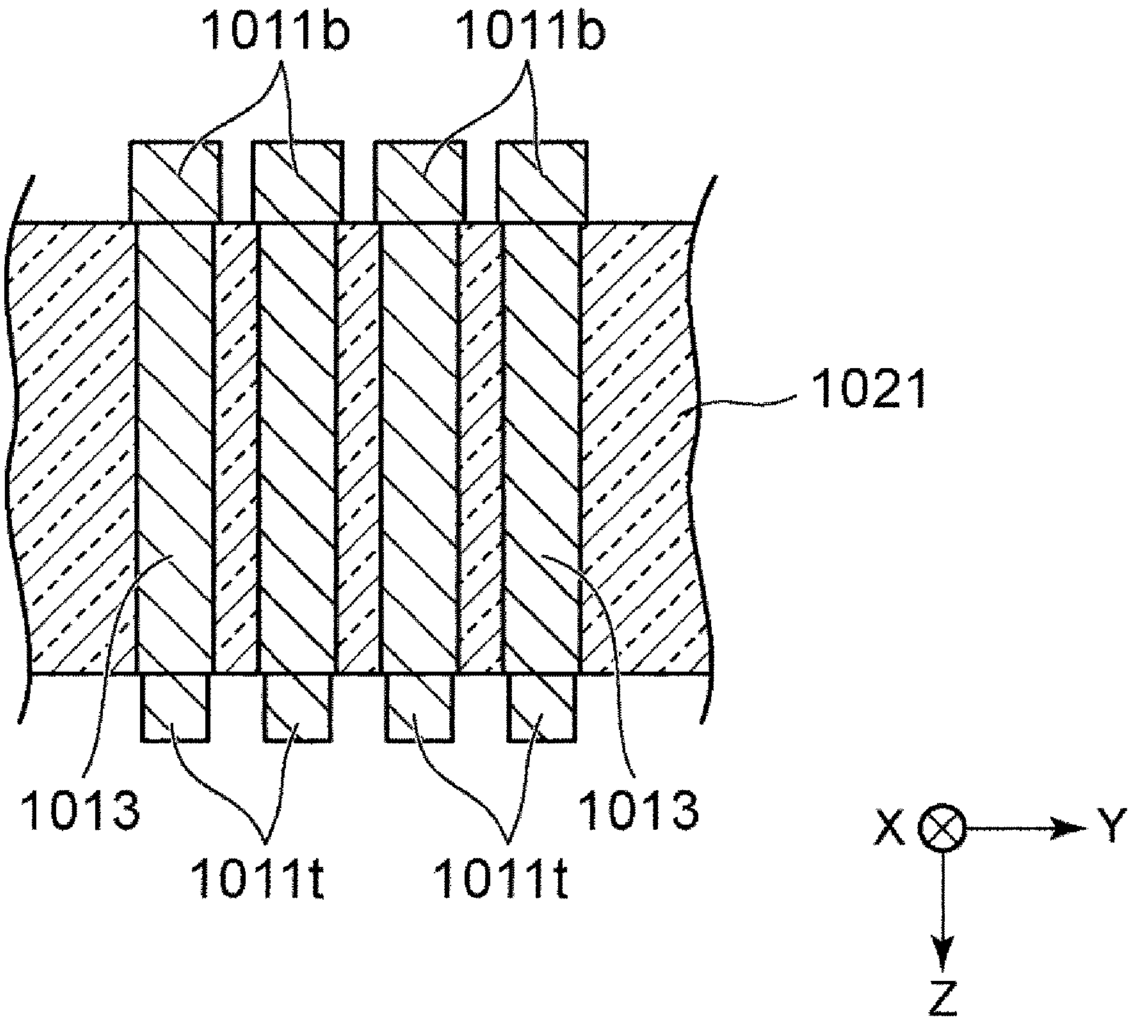
FIG. 5C is a schematic sectional view for describing the method of manufacturing the inductor component.

As illustrated in FIG. 5C, a seed layer (not illustrated) is provided on the entire surface of the glass substrate 1021, and a patterned photoresist is formed on the seed layer. Next, a copper layer is formed on the seed layer in a cavity of the photoresist by electrolytic plating. Thereafter, the photoresist and the seed layer are removed by wet etching or dry etching. Thus, a bottom surface conductor layer 1011*b* to be the bottom surface wiring 11*b* patterned in any shape and a main body conductor layer 1011*t* to be the main body 111*t* of the top surface wiring 11*t* are formed. At this time, a second portion conductor layer to be the second portion 121*e*2 of the first end surface portion 121*e* is formed, and a second portion conductor layer to be the second portion 122*e*2 of the second end surface portion 122*e* is formed although not illustrated.

In FIG. 5B, the bottom surface conductor layer 1011*b* and a main body conductor layer 1011*t* may be formed without removing the copper layer. In this case, shapes of upper surfaces of the bottom surface conductor layer 1011*b* and the main body conductor layer 1011*t* corresponding to the through hole V are concave.

Figure 5D:
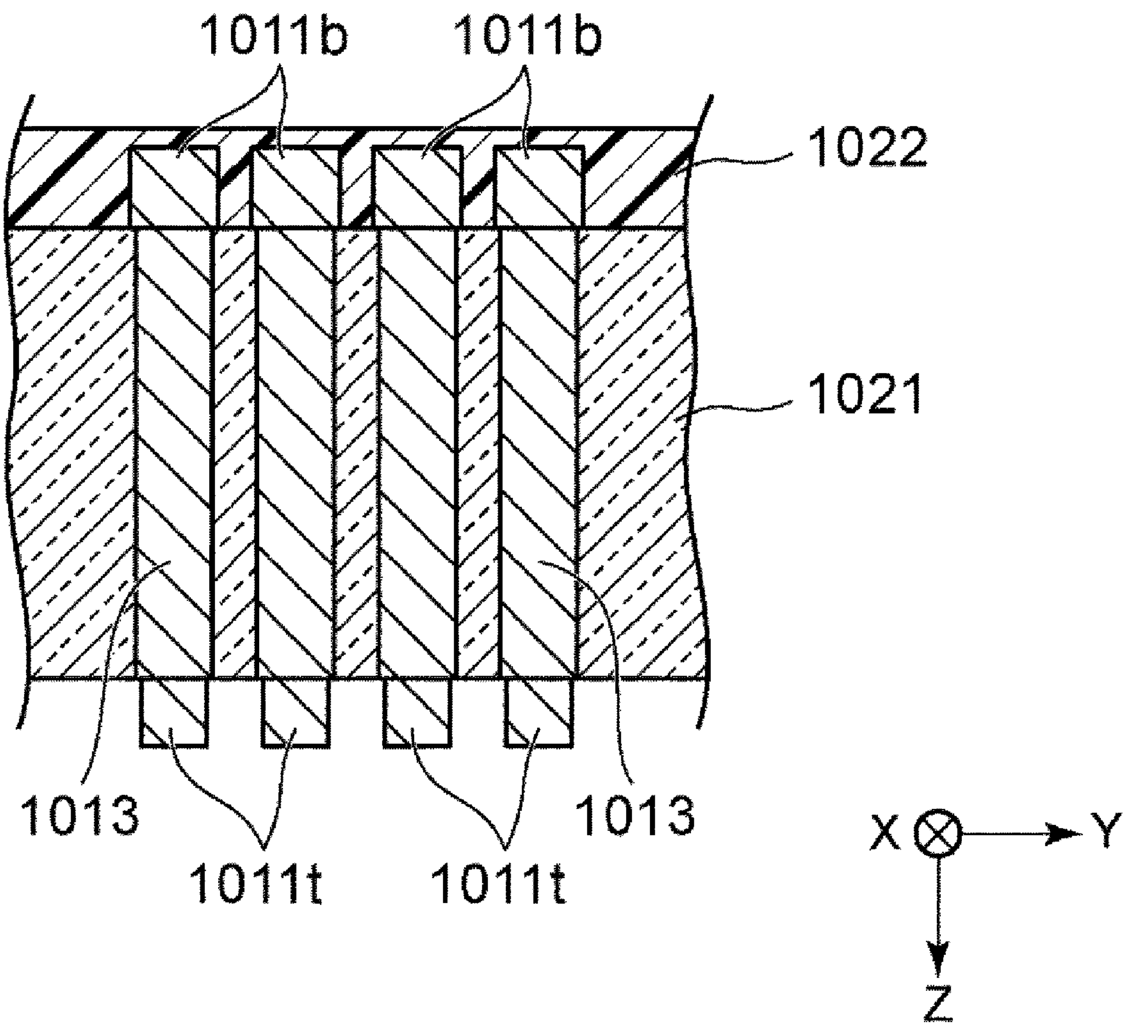
FIG. 5D is a schematic sectional view for describing the method of manufacturing the inductor component.

As illustrated in FIG. 5D, an insulating resin layer 1022 to be the insulating layer 22 is applied to the glass substrate 1021 so as to cover the bottom surface conductor layer 1011*b*, and cured.

Figure 5E:
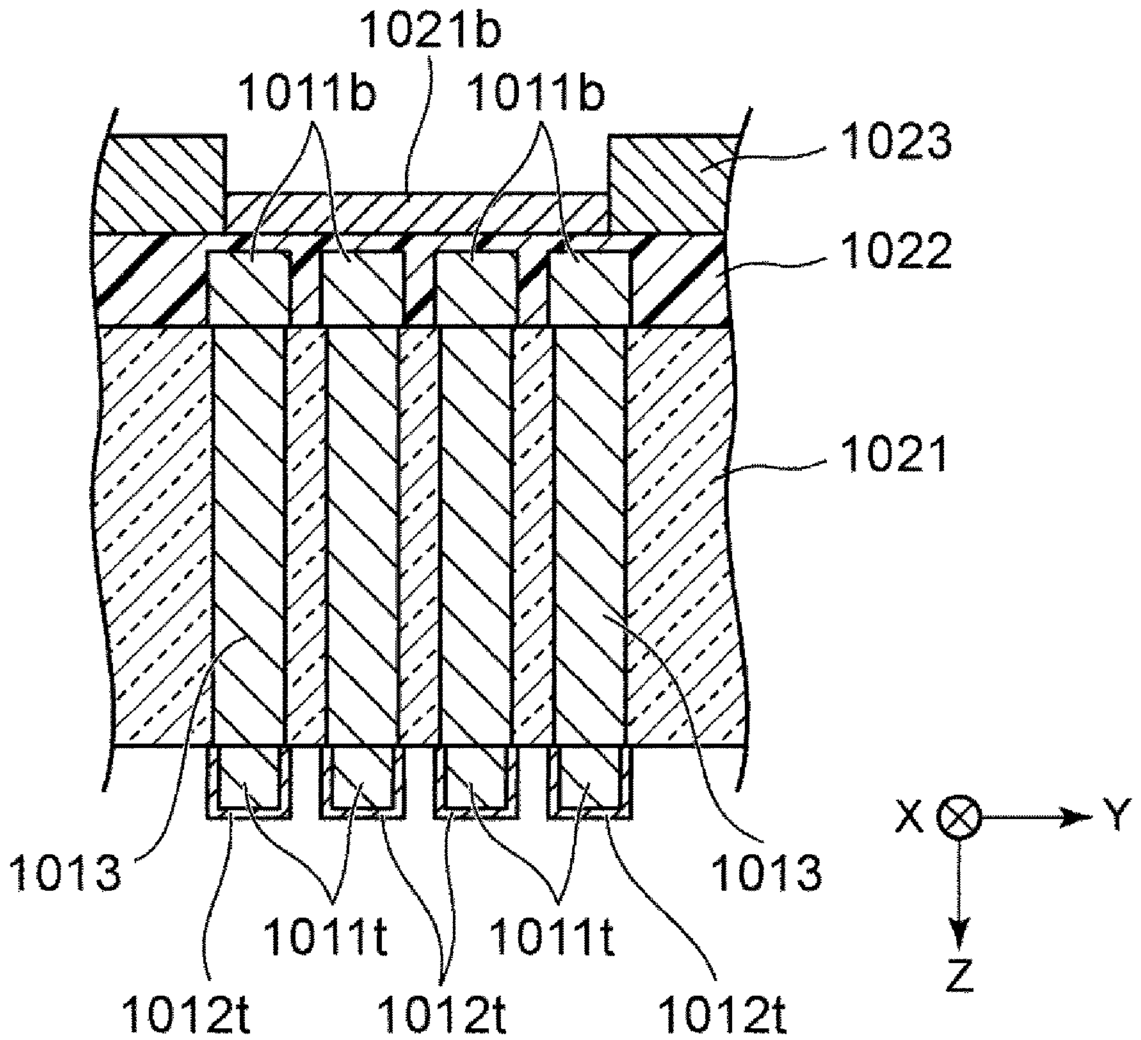
FIG. 5E is a schematic sectional view for describing the method of manufacturing the inductor component.
Figure 5F:
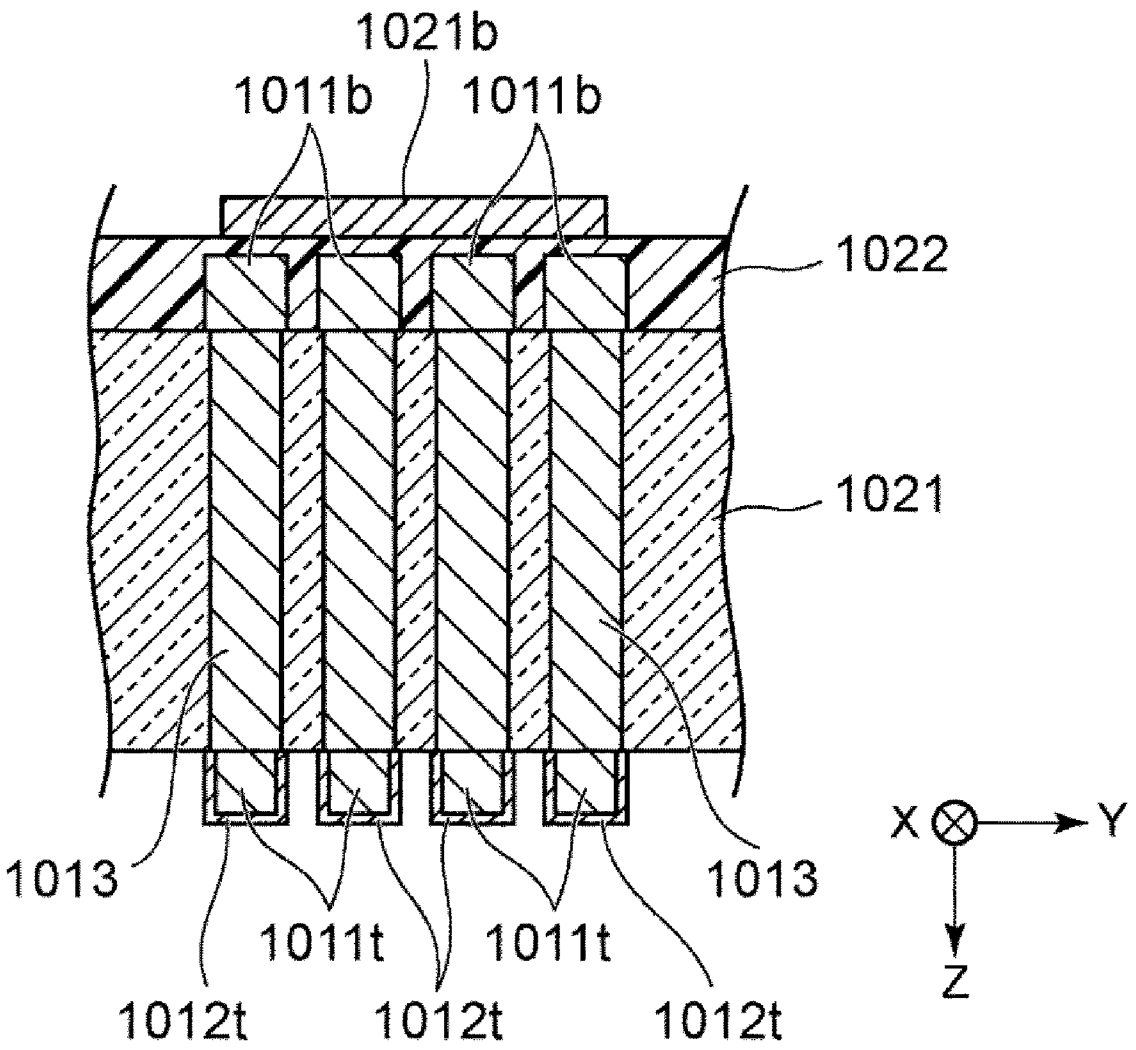
FIG. 5F is a schematic sectional view for describing the method of manufacturing the inductor component.

As illustrated in FIG. 5E, a seed layer (not illustrated) is provided on the insulating resin layer 1022, and a patterned photoresist 1023 is formed on the seed layer. Next, a catalyst layer (not illustrated) is formed on the seed layer in a cavity of the photoresist 1023 and on an exposed surface of the main body conductor layer 1011*t*. Then, a plating layer is formed on the seed layer in the cavity of the photoresist 1023 and on the exposed surface of the main body conductor layer 1011*t* by electroless plating. The plating layer is, for example, Ni/Au or the like. The plating layer may be a single layer. Thereafter, the photoresist and the seed layer are removed by wet etching or dry etching as illustrated in FIG. 5F. Thus, the first bottom surface conductor layer 1021*b* to be the first bottom surface portion 121*b* patterned in any shape and a covering conductor layer 1012*t* to be the covering layer 112*t* are formed. At this time, a second bottom surface conductor layer to be the second bottom surface portion 122*b* is formed by electroless plating although not illustrated. Note that the first bottom surface conductor layer 1021*b* and the covering conductor layer 1012*t* are simultaneously formed in the above description, but the present disclosure is not limited to this method, and for example, the following method may be used. First, a photoresist and the like is formed on the main body conductor layer 1011*t*. Next, a plating layer of Ni/Sn is formed as the first bottom surface conductor layer 1021*b* to be the first bottom surface portion 121*b*. Next, a photoresist and the like are formed on the first bottom surface conductor layer 1021*b* while removing the photoresist and the like on the main body conductor layer 1011*t*. Next, a plating layer of Ni/Au is formed on the surface of the main body conductor layer 1011*t* to form the covering conductor layer 1012*t*, and finally, the photoresist and the like on the first bottom surface conductor layer 1021*b* are removed. Thus, the covering conductor layer 1012*t* having a configuration different from that of the first bottom surface conductor layer 1021*b* can be formed.

Figure 5G:
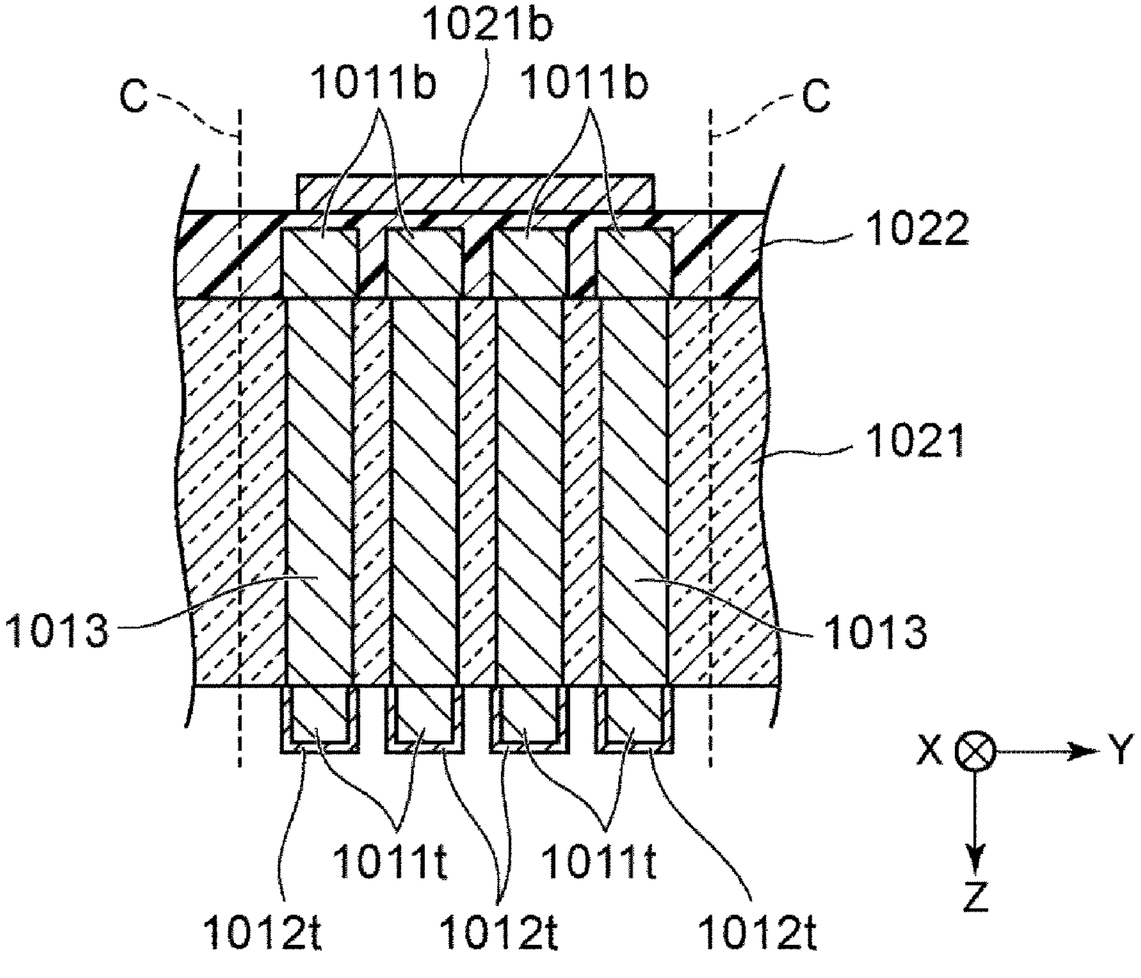
FIG. 5G is a schematic sectional view for describing the method of manufacturing the inductor component.

As illustrated in FIG. 5G, the resultant is diced into an individual piece along cut lines C to manufacture the inductor component 1. Note that a plating layer may be formed by barrel plating so as to cover each of the second portion conductor layer and the third portion conductor layer described above. The plating layer includes, for example, two layers of Ni/Au. The plating layer may include, for example, a plurality of layers of Cu/Ni/Au, Cu/Ni/Pd/Au, or the like.

Note that the copper layer is removed by wet etching or dry etching in the above manufacturing method, but CMP processing or machining may be used to remove the copper layer. In addition, the entire through conductor layer to be the through wiring is formed by plating when being formed in the through hole V, but a void portion may be filled with a conductive resin after partial plating.

In addition, the glass substrate is used as the element body in the above manufacturing method, but a sintered material may be used as the element body. In this case, the inductor wiring of one turn or less is formed by printing with a conductive paste. Here, as the conductive paste, a material having a high conductivity, such as Ag or Cu, is selected.

Next, an insulating paste, such as glass or ferrite, is printed, and this process is repeated. A cavity that is open to connecting portions of the inductor wirings is formed in the insulating paste, and the cavity is filled with the conductive paste, whereby the connecting portions of the inductor wirings between layers can be electrically connected.

Thereafter, the insulating paste is sintered by heat treatment at a high temperature, and then, diced into an individual piece to form an external terminal, thereby manufacturing the inductor component. When a material having a high insulating property, such as glass, is used as the insulating paste, the inductor component having a high Q factor at a high frequency can be obtained. When ferrite is used for the insulating paste, the inductor component having high inductance can be obtained.

3. Modification

Figure 6:
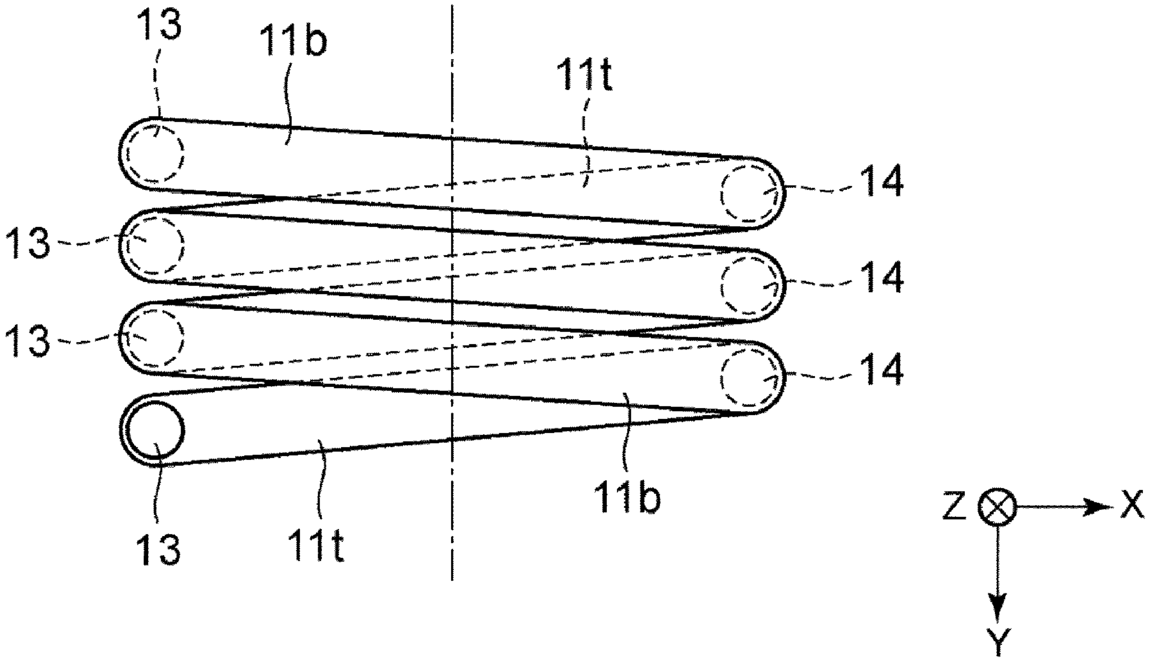
FIG. 6 is a schematic bottom view illustrating a modification of the inductor component when viewed from a bottom surface side.

FIG. 6 is a schematic bottom view illustrating a modification of the inductor component when viewed from the side of the bottom surface 100*b* (bottom surface 21*b*).

As illustrated in FIG. 6, a difference between the number of the first through wirings 13 and the number of the second through wirings 14 is one, and the first through wirings 13 and the second through wirings 14 are alternately arranged with respect to the axis AX along the axis AX of the coil 110 when viewed from a direction orthogonal to the bottom surface 21*b*. In this embodiment, the number of the first through wirings 13 is four, and the number of the second through wirings 14 is three.

In other words, regarding positions in the axis AX direction, the second through wiring 14 is located between the adjacent first through wirings 13, and the first through wiring 13 is located between the adjacent second through wirings 14. That is, the first through wirings 13 and the second through wirings 14 are arrayed in a zigzag manner along the axis AX direction.

According to the above configuration, in a case where the difference between the number of the first through wirings 13 and the number of the second through wirings 14 is one, a size of the coil 110 in the axis AX direction can be reduced as compared with a case where the both are symmetric with respect to the axis AX of the coil 110, and the inductor component 1 can be downsized.

Second Embodiment

Figure 7:
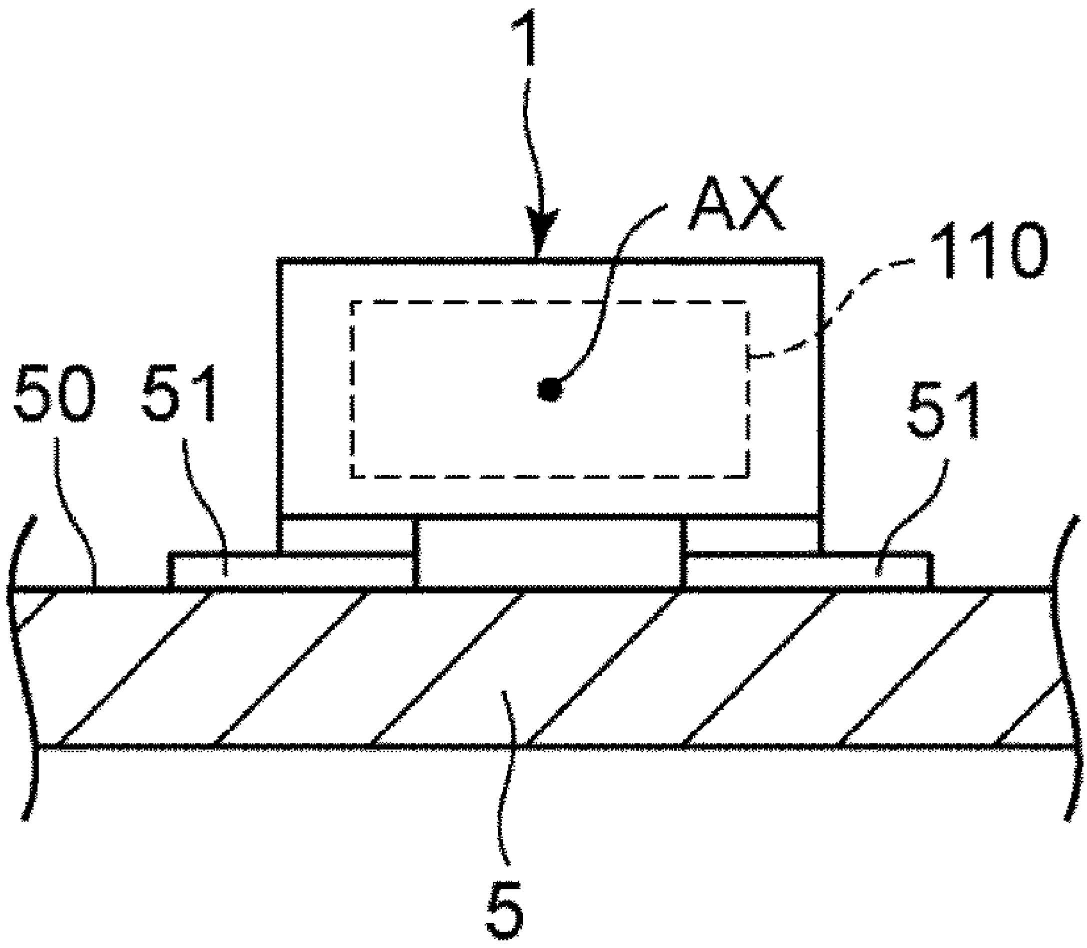
FIG. 7 is a schematic view illustrating a mounting structure of the inductor component.

FIG. 7 is a schematic view illustrating a mounting structure of an inductor component. As illustrated in FIG. 7, the mounting structure of an inductor component includes a mounting substrate 5 and the inductor component 1 of the first embodiment mounted on a mounting surface 50 of the mounting substrate 5. The mounting substrate 5 has a wiring portion 51 on the mounting surface 50. The wiring portion 51 is, for example, a conductive wiring, such as a printed wiring, and also includes a land pattern electrically and physically connecting a mounting component such as the inductor component. The axis AX of the coil 110 is parallel to the mounting surface 50. Although not illustrated in FIG. 7, a surface of a portion of the mounting substrate 5 where the wiring portion 51 does not exist may be subjected to insulation processing using a solder resist or the like.

According to the above configuration, since the axis AX of the coil 110 is parallel to the mounting surface 50, a magnetic flux of the inductor component 1 is not affected by the wiring portion 51 of the mounting substrate 5, and a decrease in inductance acquisition efficiency can be suppressed.

Figure 8:
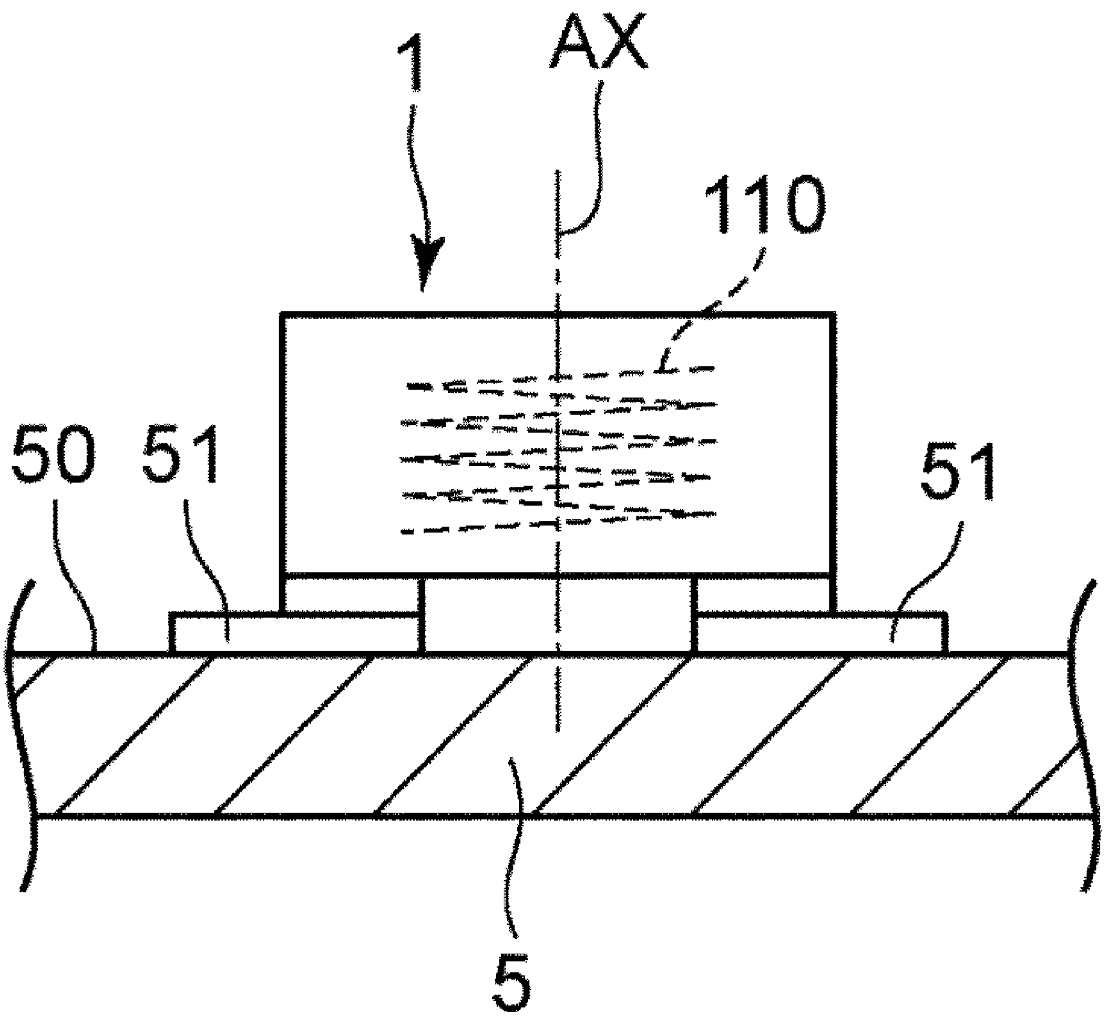
FIG. 8 is a schematic view illustrating a modification of the mounting structure of the inductor component.

FIG. 8 is a schematic view illustrating a modification of the mounting structure of an inductor component. As illustrated in FIG. 8, a mounting structure of an inductor component includes the mounting substrate 5 and the inductor component 1 of the first embodiment mounted on the mounting surface 50 of the mounting substrate 5. The axis AX of the coil 110 is orthogonal to the mounting surface 50.

According to the above configuration, since the axis AX of the coil 110 is orthogonal to the mounting surface 50, a magnetic flux of the inductor component 1 does not affect another inductor component 1 adjacent to the inductor component 1, and the degree of freedom of a mounting layout is improved.

Preferably, the axis AX of the coil 110 does not overlap the wiring portion 51. Accordingly, it is possible to suppress the magnetic flux of the inductor component 1 from being hindered by the wiring portion 51, and to suppress a decrease in the inductance acquisition efficiency.

Note that, in FIGS. 7 and 8, the inductor component may be arranged on the mounting surface such that a direction of the shortest dimension among a length, a width, and a height of an element body is orthogonal to the mounting surface. Accordingly, the direction of the shortest dimension among the length, the width, and the height of the element body becomes a thickness direction in the state of being arranged on the mounting surface, and a thickness of the inductor component can be reduced.

In addition, in FIGS. 7 and 8, the inductor component may be arranged on the mounting surface such that a direction of the longest dimension among the length, the width, and the height of the element body is orthogonal to the mounting surface. Accordingly, directions of shorter dimensions among the length, the width, and the height of the element body determine the mounting surface of the inductor component, and the mounting area of the inductor component can be reduced.

Third Embodiment

A third embodiment is different from the first embodiment in terms of a configuration of a covering layer of a top surface wiring. This different configuration will be described hereinafter. Other configurations are the same as those of the first embodiment, and the detailed description thereof will be omitted. Although the drawings are omitted in the present embodiment, the following description is given with reference to FIGS. 1 to 3 according to the first embodiment for convenience.

In the present embodiment, a conductive material forming an exposed surface exposed to the outside among outer surfaces of the both-end connecting coil wirings DW is the same as a conductive material forming an outer surface of at least a part of the first external electrode 121 and the second external electrode 122. Specifically, a conductive material forming the covering layer 112*t* of the both-end connecting coil wiring DW (top surface wiring 11*t*) is the same as a conductive material forming outer surfaces of at least the first bottom surface portion 121*b* and the second bottom surface portion 122*b* of the first external electrode 121 and the second external electrode 122. For example, when the conductive material forming each of the first bottom surface portion 121*b* and the second bottom surface portion 122*b* includes two layers of Cu/Ni, the conductive material forming the covering layer 112*t* of the both-end connecting coil wiring DW is Ni.

In general, a conductive material having high resistance to an external environment is selected as the conductive material used for the outer surface of the external electrode. According to the present embodiment, the conductive material forming the exposed surface of the both-end connecting coil wiring DW is the same as the conductive material forming the outer surface of at least a part of the first external electrode 121 and the second external electrode 122. Therefore, the resistance to the external environment can be improved in the both-end connecting coil wiring DW, and the reliability of the coil can be secured. In addition, at least a portion, located on the side opposite to the top surface 21*t*, of an outer surface of the both-end connecting coil wiring DW is exposed to the outside, and thus, a size of an inductor component in a direction (Z direction) orthogonal to the top surface 21*t* can be reduced as compared with a case where the portion is covered with an insulating layer, and the inductor component can be downsized. In addition, a part of the both-end connecting coil wiring DW can be simultaneously manufactured at the time of manufacturing the first external electrode 121 and the second external electrode 122, and thus, a manufacturing process can be simplified.

Fourth Embodiment

Figure 9:
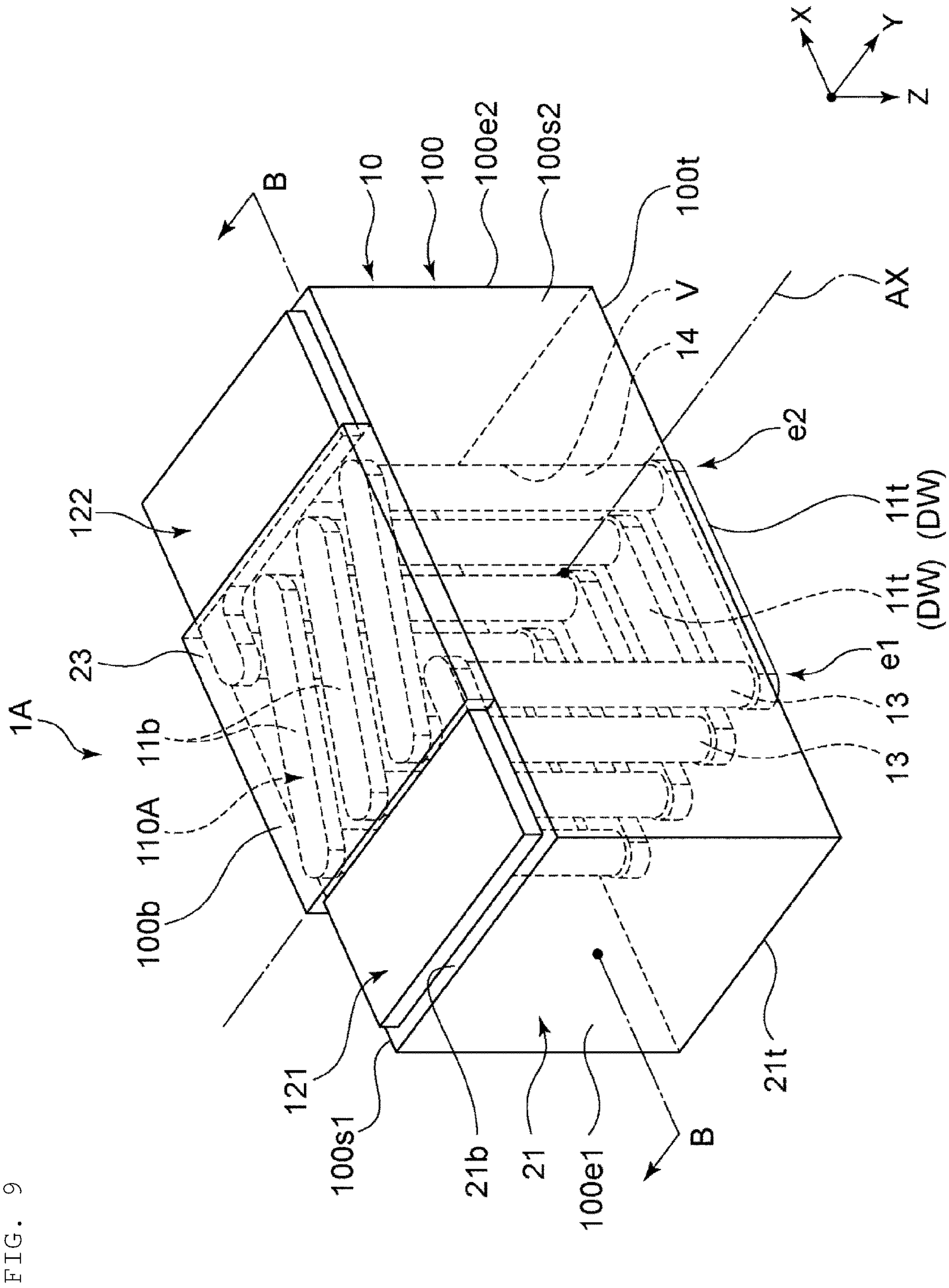
FIG. 9 is a schematic perspective view illustrating a fourth embodiment of the inductor component when viewed from a bottom surface side.
Figure 10:
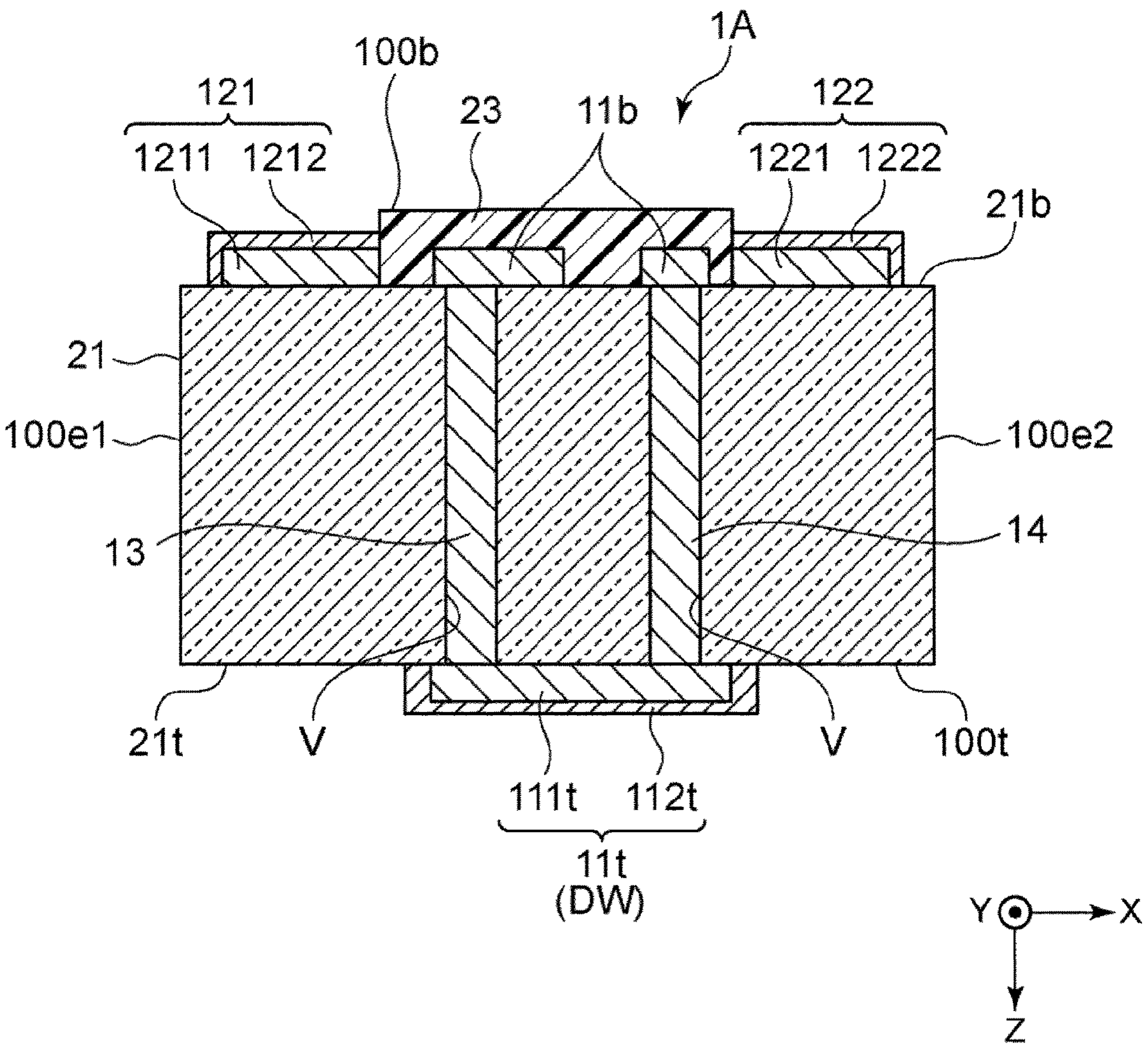
FIG. 10 is a sectional view taken along line B-B of FIG. 9.

FIG. 9 is a schematic perspective view illustrating a fourth embodiment of the inductor component when viewed from a bottom surface side. FIG. 10 is a sectional view taken along line B-B of FIG. 9. The fourth embodiment is different from the first embodiment in terms of configurations of a coil, an element body, and an external electrode. This different configuration will be described hereinafter. The other configurations are the same as those of the first embodiment, and thus, are denoted by the same reference signs as those of the first embodiment, and the description thereof will be omitted.

The element body 10 includes the substrate 21 and an insulating layer 23 provided on the substrate 21. The substrate 21 has a bottom surface 21*b* and a top surface 21*t* facing each other in the Z direction. The insulating layer 23 is provided on a part of the bottom surface 21*b* of the substrate 21. Specifically, the insulating layer 23 is provided on the bottom surface 21*b* so as to cover the entire bottom surface wiring 11*b*. In other words, the insulating layer 23 is provided on a predetermined region of the bottom surface 21*b* so as to overlap a wiring (the bottom surface wiring 11*b*) provided on the substrate 21 when viewed from the Z direction. A shape of the insulating layer 23 is not particularly limited, but is rectangular when viewed from the Z direction in the present embodiment. A material and a formation method of the insulating layer 23 may be the same as those of the insulating layer 22 in the first embodiment.

A coil 110A includes: a plurality of the bottom surface wirings 11*b* provided on the bottom surface 21*b* and covered with the insulating layer 23; a plurality of the top surface wirings 11*t* provided on the top surface 21*t*; a plurality of the first through wirings 13 provided so as to penetrate the substrate 21 from the bottom surface 21*b* to the top surface 21*t* and arranged along the axis AX; and a plurality of the second through wirings 14 provided so as to penetrate the substrate 21 from the bottom surface 21*b* to the top surface 21*t*, arranged on the side opposite to the first through wirings 13 with respect to the axis AX, and arranged along the axis AX. The bottom surface wiring 11*b*, the first through wiring 13, the top surface wiring 11*t*, and the second through wiring 14 are connected in this order to constitute at least a part of the spiral shape.

The bottom surface wirings 11*b* extend only in one direction. Specifically, the bottom surface wirings 11*b* extend in the X direction to be slightly inclined in the Y direction. The plurality of bottom surface wirings 11*b* are arranged side by side along the Y direction to be parallel to each other.

The top surface wirings 11*t* extend only in one direction. Specifically, the top surface wiring 11*t* has a shape extending in the X direction. The plurality of top surface wirings 11*t* are arranged side by side along the Y direction to be parallel to each other.

The top surface wiring 11*t* includes the both-end connecting coil wiring DW in which the first end portion e1 is connected to the first through wiring 13 and the second end portion e2 is connected to the second through wiring 14. In the present embodiment, all the top surface wirings 11*t* are the both-end connecting coil wirings DW.

The portion of the outer surface of the both-end connecting coil wiring DW located on the opposite side to the top surface 21*t* is exposed to at least the outside, and the exposed surface of the outer surface exposed to the outside contains the corrosion-resistant conductive material. In the present embodiment, the both-end connecting coil wiring DW includes the main body 111*t* and the covering layer 112*t* covering the main body 111*t* and containing a corrosion-resistant conductive material as illustrated in FIG. 10. The main body 111*t* is provided on the top surface 21*t* and extends in the X direction. A shape of the main body 111*t* is not particularly limited. A conductive material of the main body 111*t* is preferably the same as a conductive material of the bottom surface wiring 11*b*. Thus, the main body 111*t* can also be manufactured at the time of manufacturing the bottom surface wiring 11*b*, and the manufacturing process can be simplified. The covering layer 112*t* covers the entire outer surface other than an outer surface on the side of the top surface 21*t* out of the outer surface of the main body 111*t*. With the above configuration, among outer surfaces of the both-end connecting coil wiring DW, outer surfaces other than an outer surface on the side of the top surface 21*t* become the exposed surfaces, and the exposed surfaces contain the corrosion-resistant conductive material. Note that the entire covering layer 112*t* may be made of a corrosion-resistant conductive material. Thus, the corrosion resistance of the both-end connecting coil wiring DW can be effectively enhanced.

The first through wiring 13 is arranged on the side of the first end surface 100*e*1 with respect to the axis AX in the through hole V of the element body 10, and the second through wiring 14 is arranged on the side of the second end surface 100*e*2 with respect to the axis AX in the through hole V of the element body 10. The first through wiring 13 and the second through wiring 14 extend in directions orthogonal to the bottom surface 21*b* and the top surface 21*t* (the bottom surface 100*b* and the top surface 100*t*), respectively. The plurality of first through wirings 13 and the plurality of second through wirings 14 are arranged side by side along the Y direction to be parallel to each other.

The first external electrode 121 is provided on the bottom surface 21*b* so as to be away from the bottom surface wiring 11*b* to the negative X-direction side when viewed from the Z direction. Since the first external electrode 121 is provided on the bottom surface 21*b*, at least a part of the first external electrode 121 can be simultaneously formed at the time of manufacturing the bottom surface wiring 11*b*. Therefore, the first external electrode 121 can be easily manufactured. A shape of the first external electrode 121 is not particularly limited, but is rectangular when viewed from the Z direction in the present embodiment. As illustrated in FIG. 10, the first external electrode 121 includes a main body 1211 and a covering layer 1212. The main body 1211 is provided on the bottom surface 21*b*. An outer surface of the main body 1211 on the positive X-direction side is in contact with a side surface of the insulating layer 23 on the negative X-direction side. A conductive material of the main body 1211 is preferably the same as the conductive material of the bottom surface wiring 11*b*. Thus, the main body 1211 can be simultaneously formed at the time of manufacturing the bottom surface wiring 11*b*. The covering layer 1212 covers an outer surface of the main body 1211 except for contact surfaces with the bottom surface 21*b* and the insulating layer 23. A conductive material of the covering layer 1212 is preferably the same as a conductive material of the covering layer 112*t* of the top surface wiring 11*t*. Thus, the covering layer 1212 can be simultaneously formed at the time of manufacturing the covering layer 112*t*.

The second external electrode 122 is provided on the bottom surface 21*b* so as to be away from the bottom surface wiring 11*b* to the positive X-direction side when viewed from the Z direction. Since the second external electrode 122 is provided on the bottom surface 21*b*, at least a part of the second external electrode 122 can be simultaneously formed at the time of manufacturing the bottom surface wiring 11*b*. Therefore, the second external electrode 122 can be easily manufactured. A shape of the second external electrode 122 is not particularly limited, but is rectangular when viewed from the Z direction in the present embodiment. As illustrated in FIG. 10, the second external electrode 122 includes a main body 1221 and a covering layer 1222. The main body 1221 is provided on the bottom surface 21*b*. An outer surface of the main body 1221 on the negative X-direction side is in contact with a side surface of the insulating layer 23 on the positive X-direction side. A conductive material of the main body 1221 is preferably the same as the conductive material of the bottom surface wiring 11*b*. Thus, the main body 1221 can be simultaneously formed at the time of manufacturing the bottom surface wiring 11*b*. The covering layer 1222 covers an outer surface of the main body 1221 except for contact surfaces with the bottom surface 21*b* and the insulating layer 23. A conductive material of the covering layer 1222 is preferably the same as the conductive material of the covering layer 112*t* of the top surface wiring 11*t*. Thus, the covering layer 1222 can be simultaneously formed at the time of manufacturing the covering layer 112*t*.

According to the present embodiment, the outer surfaces other than the outer surface on the side of the top surface 21*t* are the exposed surfaces among the outer surfaces of the both-end connecting coil wirings DW. Therefore, a portion, located on the side opposite to the top surface 21*t*, of the outer surface of the both-end connecting coil wiring DW is exposed to the outside, and a size of an inductor component 1A in the direction orthogonal to the top surface 21*t* can be reduced as compared with a case where the portion is covered with an insulating layer, and the inductor component 1A can be downsized. Since the exposed surface exposed to the outside contains the corrosion-resistant conductive material, the corrosion resistance of the both-end connecting coil wiring DW can be enhanced to protect the both-end connecting coil wiring DW from deterioration caused by an external environment although the both-end connecting coil wiring DW has the exposed surface.

In addition, according to the present embodiment, the first external electrode 121 and the second external electrode 122 are provided on the bottom surface 21*b*, and the bottom surface wiring 11*b* is covered with the insulating layer 23. Therefore, when the first external electrode 121 and the second external electrode 122 are provided on the bottom surface 21*b*, insulation of the bottom surface wiring 11*b* from the first external electrode 121 and the second external electrode 122 can be secured. In addition, the first and second external electrodes 121 and 122 can be easily manufactured since the first and second external electrodes 121 and 122 are provided on the bottom surface 21*b*. In addition, the insulating layer 23 is provided on the bottom surface 21*b*, and no insulating layer is provided on the top surface 21*t* including the top surface wiring 11*t*, and thus, the inductor component 1A can be downsized.

Fifth Embodiment

Figure 11:
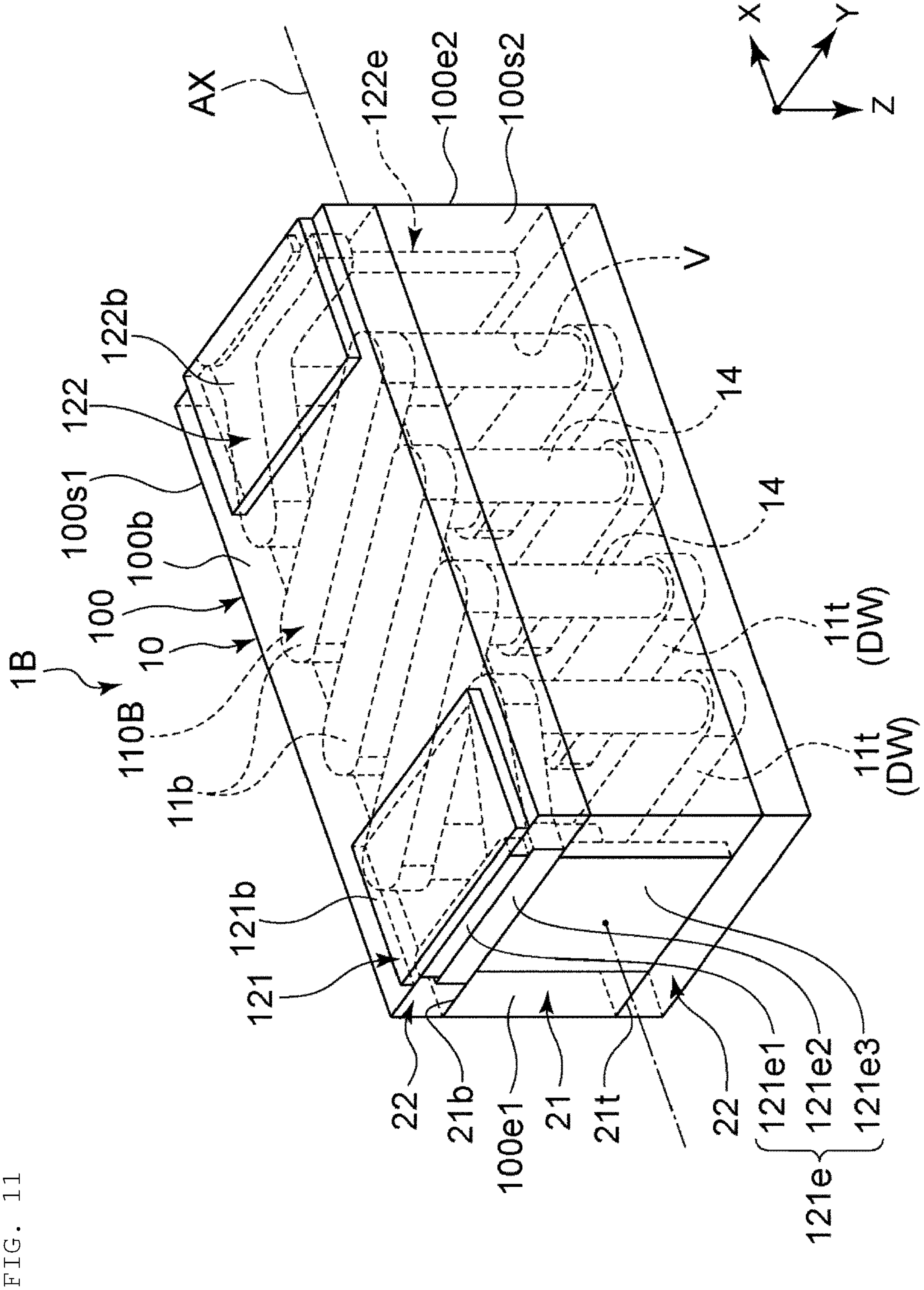
FIG. 11 is a schematic perspective view illustrating a fifth embodiment of the inductor component when viewed from a bottom surface side.
Figure 12:
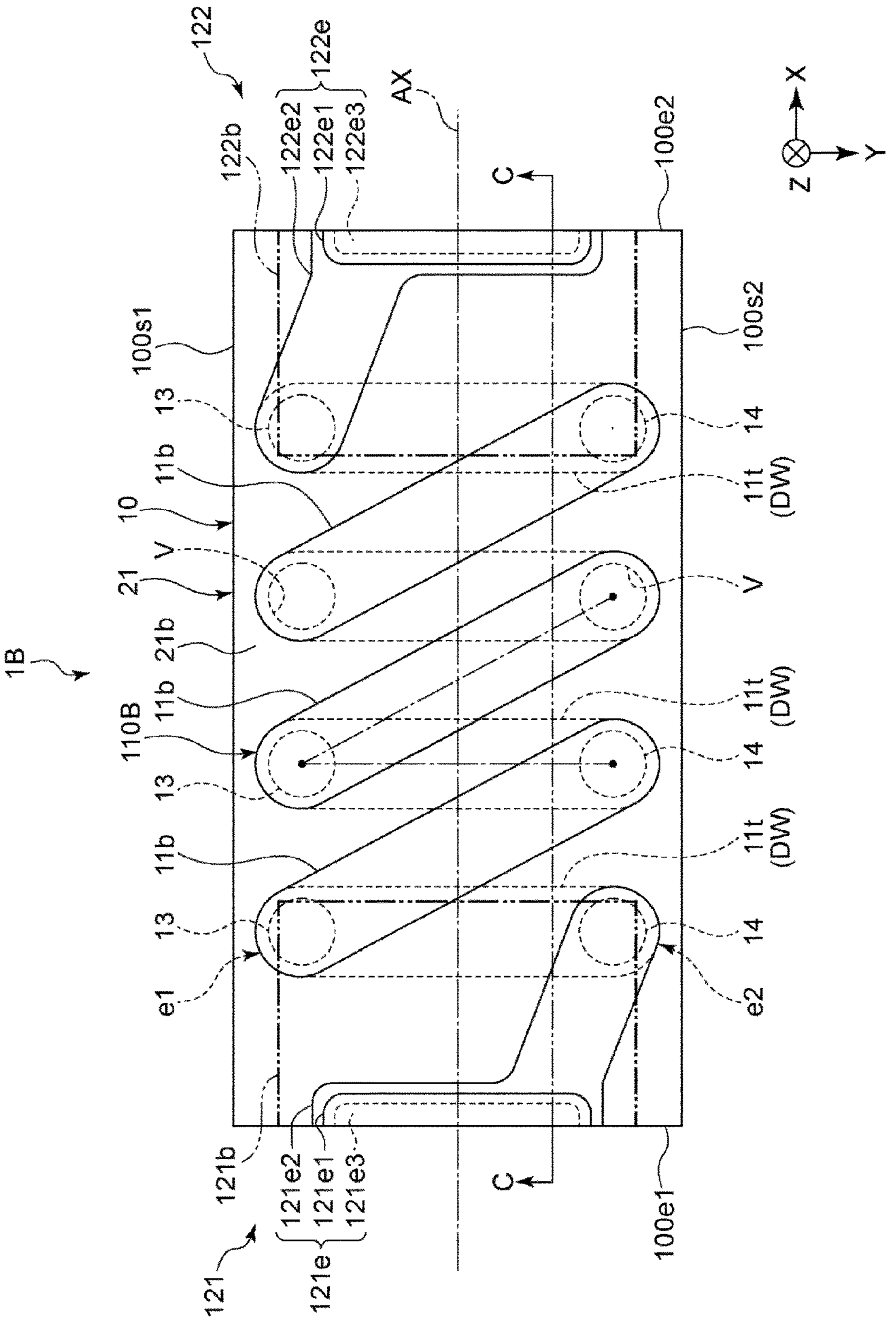
FIG. 12 is a schematic bottom view of the inductor component when viewed from the bottom surface side.
Figure 13:
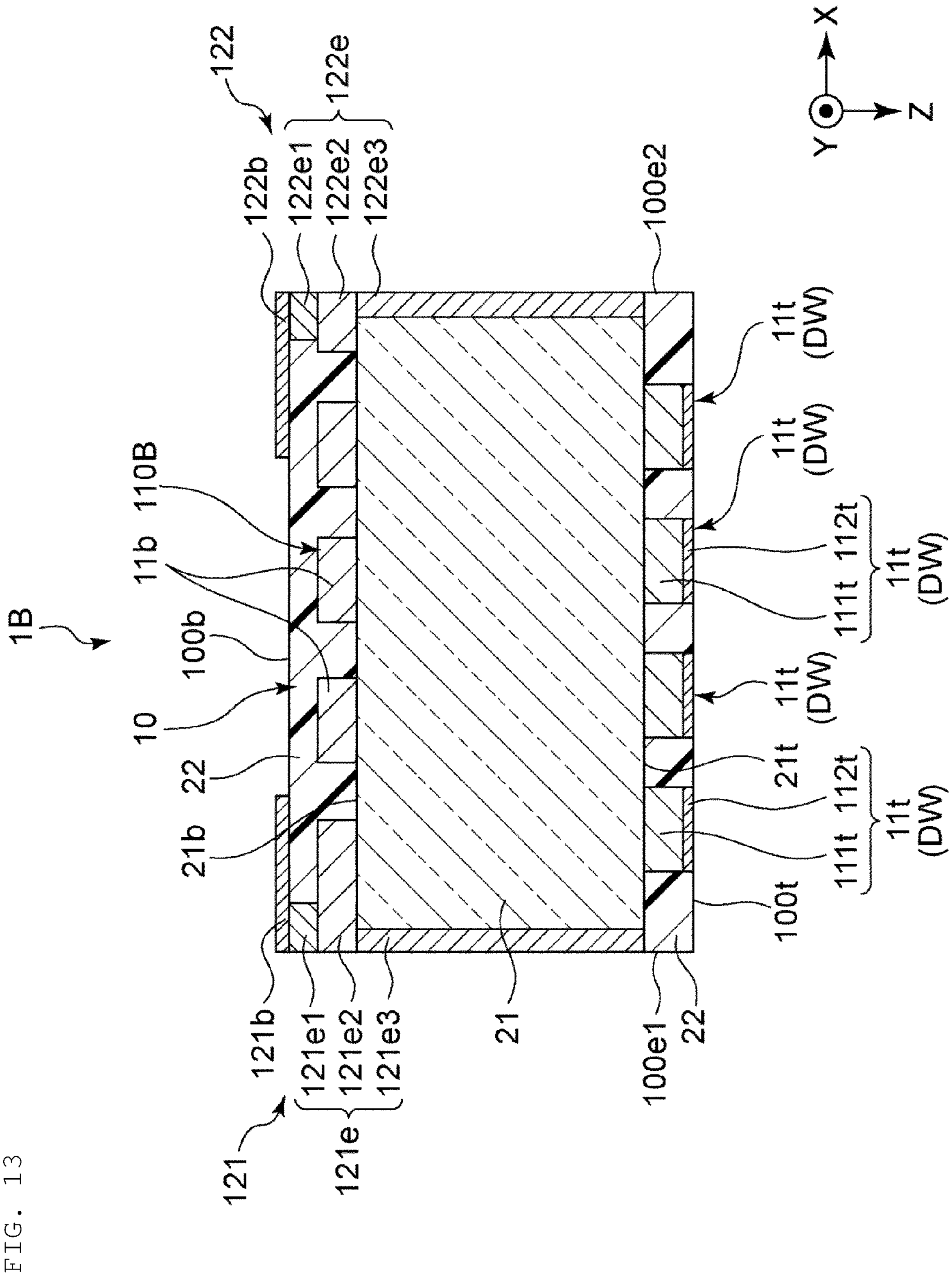
FIG. 13 is a sectional view taken along line C-C in FIG. 12.

FIG. 11 is a schematic perspective view illustrating a fifth embodiment of the inductor component when viewed from a bottom surface side. FIG. 12 is a schematic bottom view of the inductor component when viewed from the bottom surface side. FIG. 13 is a sectional view taken along line C-C of FIG. 12. In FIG. 12, for convenience, an insulating layer of an element body is omitted, and a part (bottom surface portion) of an external electrode is drawn by a two-dot chain line. The fifth embodiment is different from the first embodiment in terms of configurations of a coil and an element body. This different configuration will be described hereinafter. The other configurations are the same as those of the first embodiment, and thus, are denoted by the same reference signs as those of the first embodiment, and the description thereof will be omitted.

A coil 110B includes: the bottom surface wiring 11*b* arranged above the bottom surface 21*b* of the substrate 21 and covered with the insulating layer 22; the top surface wiring 11*t* arranged above the top surface 21*t* of the substrate 21 and having a portion covered with the insulating layer 22; and the pair of through wirings 13 and 14 penetrating the substrate 21 from the bottom surface 21*b* to the top surface 21*t* and arranged on opposite sides with respect to the axis AX. Both side surfaces of the top surface wiring 11*t* in the X direction are covered with the insulating layers 22, and an upper surface of the top surface wiring 11*t* in the Z direction is exposed from the insulating layer 22.

The bottom surface wiring 11*b* extends only in one direction. Specifically, the bottom surface wiring 11*b* extends in the Y direction to be slightly inclined in the X direction. The plurality of bottom surface wirings 11*b* are arranged in parallel along the X direction.

The top surface wiring 11*t* extends only in one direction. Specifically, the top surface wiring 11*t* has a shape extending in the Y direction. The plurality of top surface wirings 11*t* are arranged in parallel along the X direction. The top surface wiring 11*t* includes the both-end connecting coil wiring DW in which the first end portion e1 is connected to the first through wiring 13 and the second end portion e2 is connected to the second through wiring 14. In the present embodiment, all the top surface wirings 11*t* are the both-end connecting coil wirings DW.

The portion of the outer surface of the both-end connecting coil wiring DW located on the opposite side to the top surface 21*t* is exposed to at least the outside, and the exposed surface of the outer surface exposed to the outside contains the corrosion-resistant conductive material. Specifically, as illustrated in FIG. 13, each of the both-end connecting coil wirings DW includes the main body 111*t* and the covering layer 112*t* covering a part of an outer surface of the main body 111*t* and containing a corrosion-resistant conductive material. The main body 111*t* is provided on the top surface 21*t* and extends in the Y direction. A shape of the main body 111*t* is not particularly limited. In the present embodiment, the main body 111*t* has a rectangular shape in a section orthogonal to the Y direction. A conductive material of the main body 111*t* is preferably the same as that of the bottom surface wiring 11*b*. Thus, the main body 111*t* can also be manufactured at the time of manufacturing the bottom surface wiring 11*b*, and the manufacturing process can be simplified. The covering layer 112*t* covers an outer surface (in other words, an upper surface of the main body 111*t* in the Z direction) facing an outer surface on the side of the top surface 21*t* among outer surfaces of the main body 111*t*. A conductive material of the covering layer 112*t* is preferably the same as a conductive material of the first external electrode 121 and the second external electrode 122.

In the element body 10, the insulating layer 22 is provided on the top surface 21*t* of the substrate 21. Specifically, the insulating layer 22 is provided on the top surface 21*t* so as to cover both the side surfaces of the both-end connecting coil wiring DW in the X direction. In the Z direction, a thickness of the insulating layer 22 is the same as a thickness of the both-end connecting coil wiring DW.

With the above configuration, among outer surfaces of the both-end connecting coil wiring DW, an outer surface facing the outer surface on the side of the top surface 21*t* becomes the exposed surface, and the exposed surface contains the corrosion-resistant conductive material. Note that the entire covering layer 112*t* may be made of a corrosion-resistant conductive material. Thus, the corrosion resistance of the both-end connecting coil wiring DW can be more effectively enhanced.

According to the present embodiment, the outer surface facing the outer surface on the side of the top surface 21*t* is the exposed surface among the outer surfaces of the both-end connecting coil wirings DW. Therefore, a portion, located on the side opposite to the top surface 21*t*, of the outer surface of the both-end connecting coil wiring DW is exposed to the outside, and a size of an inductor component 1B in the direction orthogonal to the top surface 21*t* can be reduced as compared with a case where the portion is covered with an insulating layer, and the inductor component 1B can be downsized. Since the exposed surface exposed to the outside contains the corrosion-resistant conductive material, the corrosion resistance of the both-end connecting coil wiring DW can be enhanced to protect the both-end connecting coil wiring DW from deterioration caused by an external environment although the both-end connecting coil wiring DW has the exposed surface.

In addition, the insulating layer 22 is provided between the adjacent both-end connecting coil wirings DW (top surface wirings 11*t*) according to the present embodiment, and thus, insulation between the adjacent both-end connecting coil wirings DW can be secured. In addition, since the insulating layer 22 is provided between the adjacent both-end connecting coil wirings DW, and the insulating layer 22 is not provided on the both-end connecting coil wirings DW, and thus, the inductor component can be downsized while securing the insulation between the adjacent both-end connecting coil wirings DW.

Note that the present disclosure is not limited to the above-described embodiments, and can be modified in design within the scope not departing from the gist of the present disclosure. For example, characteristic points of the first to fifth embodiments may be variously combined.

The plurality of bottom surface wirings are present in the first to fifth embodiments, but at least one bottom surface wiring may be present. At least one of the top surface wiring, the first through wiring, and the second through wiring may be present.

What is claimed is:

1. An inductor component comprising:

an element body including a substrate having a first principal surface and a second principal surface facing each other and an end surface extending in a direction orthogonal to the first principal surface; and a coil on the element body and wound into a spiral shape along an axis, wherein the coil includes at least one first coil wiring on the first principal surface, at least one second coil wiring on the second principal surface, at least one first through wiring which penetrates the substrate from the first principal surface to the second principal surface, and at least one second through wiring which penetrates the substrate from the first principal surface to the second principal surface, and is on a side opposite to the first through wiring with respect to the axis, the first coil wiring, the first through wiring, the second coil wiring, and the second through wiring are connected in this order to constitute at least a part of the spiral shape, the at least one second coil wiring includes a both-end connecting coil wiring having a first end portion connected to the first through wiring and a second end portion connected to the second through wiring, a portion of an outer surface of the both-end connecting coil wiring is exposed to at least an outside, the portion being located on a side opposite to the second principal surface, an exposed surface of the outer surface of the both-end connecting coil wiring exposed to the outside contains a corrosion-resistant conductive material, an insulating layer is disposed on the first principal surface, an external electrode is disposed on the insulating layer such that the insulating layer is disposed between the external electrode and the first coil wiring in the direction orthogonal to the first principal surface, and the external electrode is electrically connected to the coil via an end surface portion of the external electrode that is exposed to the outside on the end surface of the element body.

2. The inductor component according to claim 1, wherein the corrosion-resistant conductive material is identical to a conductive material configuring an outer surface of the external electrode.

3. The inductor component according to claim 2, wherein the external electrode is on the first principal surface of the substrate.

4. The inductor component according to claim 1, wherein the corrosion-resistant conductive material is Au, Ti, a Ti alloy, Al, or an Al alloy.

5. The inductor component according to claim 2, wherein the corrosion-resistant conductive material is Au, Ti, a Ti alloy, Al, or an Al alloy.

6. The inductor component according to claim 1, wherein the first coil wiring includes one or more conductive layers, the both-end connecting coil wiring includes two or more conductive layers, and a number of the conductive layers of the both-end connecting coil wiring is larger than a number of the conductive layers of the first coil wiring.

7. The inductor component according to claim 1, wherein no insulating layer is on the second coil wiring.

8. The inductor component according to claim 1, wherein a conductive material as a main component of the first coil wiring and a conductive material as a main component of the second coil wiring are identical to a conductive material of at least one of the first through wiring and the second through wiring.

9. The inductor component according to claim 1, wherein the first coil wiring is covered with the insulating layer.

10. The inductor component according to claim 1, wherein the second coil wiring includes a main body including a conductive material identical to a conductive material of the first coil wiring, and a covering layer covering the main body and containing the corrosion-resistant conductive material, and a line width of the main body is smaller than a line width of the first coil wiring.

11. The inductor component according to claim 10, wherein at least a part of the covering layer covers outer surfaces of the main body on both sides in a width direction, and $W1>W21>W221+W222$ is satisfied, where W1 is a line width of the second coil wiring, W21 is the line width of the main body, W221 is a width of the covering layer covering the outer surface of the main body on one side in the width direction, and W222 is a width of the covering layer covering the outer surface of the main body on another side in the width direction.

12. The inductor component according to claim 10, wherein $T1>T21>2\times T22$ is satisfied, where T1 is a thickness of the second coil wiring, T21 is the thickness of the main body, and T22 is a thickness of the covering layer in a direction orthogonal to the second principal surface.

13. The inductor component according to claim 1, wherein the second coil wiring includes a main body including a conductive material identical to the conductive material of the first coil wiring, and a covering layer covering the main body and containing the corrosion-resistant conductive material, and a thickness of the main body is smaller than a thickness of the first coil wiring.

14. The inductor component according to claim 1, wherein a plurality of the second coil wirings is present, and an insulating layer is between the second coil wirings adjacent to each other.

15. The inductor component according to claim 1, wherein a plurality of the first coil wirings, a plurality of the second coil wirings, a plurality of the first through wirings, and a plurality of the second through wirings are present, a pitch between the first through wirings adjacent to each other is from 10 μm to 150 μm, and a pitch between the second through wirings adjacent to each other is from 10 μm to 150 μm.

16. A mounting structure of an inductor component, comprising:

a mounting substrate; and the inductor component according to claim 1 mounted on a mounting surface of the mounting substrate, wherein the axis of the coil is orthogonal to the mounting surface.

17. The mounting structure of an inductor component according to claim 16, wherein the element body has a length, a width, and a height, and the inductor component is arranged on the mounting surface in such a manner that a direction of a shortest dimension among the length, the width, and the height of the element body is orthogonal to the mounting surface.

18. The mounting structure of an inductor component according to claim 16, wherein the element body has a length, a width, and a height, and the inductor component is arranged on the mounting surface in such a manner that a direction of a longest dimension among the length, the width, and the height of the element body is orthogonal to the mounting surface.

19. A mounting structure of an inductor component, comprising:

a mounting substrate; and the inductor component according to claim 1 mounted on a mounting surface of the mounting substrate, wherein the axis of the coil is parallel to the mounting surface.

* * * * *